United States Patent
Kaneeda et al.

(10) Patent No.: US 10,440,534 B2
(45) Date of Patent: Oct. 8, 2019

(54) SENSOR NODE AND METHOD OF CONTROLLING THE SAME

(71) Applicant: Fujikura Ltd., Tokyo (JP)

(72) Inventors: Kenta Kaneeda, Sakura (JP); Toshimitsu Asakura, Sakura (JP); Taku Taguchi, Sakura (JP); Hiroyuki Hayashi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 159 days.

(21) Appl. No.: 15/543,730

(22) PCT Filed: Feb. 26, 2016

(86) PCT No.: PCT/JP2016/055934
§ 371 (c)(1),
(2) Date: Jul. 14, 2017

(87) PCT Pub. No.: WO2016/136989
PCT Pub. Date: Sep. 1, 2016

(65) Prior Publication Data
US 2018/0270632 A1    Sep. 20, 2018

(30) Foreign Application Priority Data

Feb. 27, 2015  (JP) ................................. 2015-038358

(51) Int. Cl.
*H04W 4/38* (2018.01)
*G08C 17/02* (2006.01)
(Continued)

(52) U.S. Cl.
CPC .............. *H04W 4/38* (2018.02); *G08C 17/00* (2013.01); *G08C 17/02* (2013.01); *G08C 19/00* (2013.01);
(Continued)

(58) Field of Classification Search
CPC ........ G08C 17/00; G08C 17/02; G08C 19/00; G08C 2201/12; G08C 2201/51;
(Continued)

(56) References Cited

U.S. PATENT DOCUMENTS 8,035,491 B2 * 10/2011 Banks ................... H04L 1/1867
340/286.02
8,552,857 B2  10/2013 Berezowski et al.
(Continued)

FOREIGN PATENT DOCUMENTS

JP       9-46638 A    2/1997
JP      11-27651 A    1/1999
(Continued)

OTHER PUBLICATIONS

Extended (Supplementary) Search Report dated Sep. 6, 2018, issued in counterpart to European Application No. 16755733.9 (5 pages).
(Continued)

*Primary Examiner* — Bryan Bui
(74) *Attorney, Agent, or Firm* — Westerman, Hattori, Daniels & Adrian, LLP

(57) ABSTRACT

A sensor node of the invention includes: a first to nth (n is an integer equal to or greater than two) environmental sensors which are configured to acquire ambient environmental information; a transmitter that is configured to regularly issue ambient environmental information acquired by at least one of the second to nth environmental sensors at a predetermined cycle and is configured to irregularly issue ambient environmental information acquired by the first environmental sensor and ambient environmental information acquired by at least one of the second to nth environmental sensors; a detector that is configured to detect a change value of ambient environmental information acquired by the first environmental sensor greater than a first threshold value; and a transmission interval controller that is configured to control a timing at which the transmitter regularly and irregularly issues the ambient environmental information.

9 Claims, 11 Drawing Sheets

(51) Int. Cl.
*G08C 19/00* (2006.01)
*H02J 7/00* (2006.01)
*G08C 17/00* (2006.01)
*H04Q 9/00* (2006.01)
*H02J 7/35* (2006.01)

(52) U.S. Cl.
CPC .............. *H02J 7/00* (2013.01); *H02J 7/35* (2013.01); *H04Q 9/00* (2013.01); *G08C 2201/114* (2013.01); *G08C 2201/12* (2013.01); *G08C 2201/51* (2013.01); *H04Q 2209/823* (2013.01); *H04Q 2209/826* (2013.01); *H04Q 2209/845* (2013.01); *H04Q 2209/886* (2013.01); *Y02P 90/50* (2015.11)

(58) Field of Classification Search
CPC .... H04W 4/38; H02J 7/00; H02J 7/35; H04Q 9/00; Y02P 90/50
See application file for complete search history.

(56) References Cited

U.S. PATENT DOCUMENTS

2002/0186128 A1* 12/2002 Amano et al. ......... G08B 17/06
340/522
2004/0150722 A1 8/2004 Hiroki
2012/0239297 A1 9/2012 Yokota et al.
2014/0056286 A1 2/2014 Nagata

FOREIGN PATENT DOCUMENTS

| JP | 2001-36775 A | 2/2001 |
| JP | 2003-85677 A | 3/2003 |
| JP | 2003-346271 A | 12/2003 |
| JP | 2004-88482 A | 3/2004 |
| JP | 2005-109801 A | 4/2005 |
| JP | 2005-267159 A | 9/2005 |
| JP | 2007-60550 A | 3/2007 |
| JP | 2008-140019 A | 6/2008 |
| JP | 2009-135811 A | 6/2009 |
| JP | 2010-177893 A | 8/2010 |
| JP | 2010-224701 A | 10/2010 |
| JP | 2012-198715 A | 10/2012 |
| WO | 2012/114738 A1 | 8/2012 |

OTHER PUBLICATIONS

Notice of Allowance dated Sep. 11, 2018, issued in counterpart Japanese Application No. 2017-502535, with English translation (7 pages).

Office Action dated Jun. 5, 2018, issued in counterpart Japanese Application No. 2017-502535. (6 pages).

* cited by examiner

SENSOR NODE AND METHOD OF CONTROLLING THE SAME

TECHNICAL FIELD

The present invention relates to a sensor node and a method of controlling a sensor node, which acquire and transmit ambient environmental information by a sensor.

This application claims priority from Japanese Patent Application No. 2015-38358, filed Feb. 27, 2015, the contents of which are incorporated herein by reference in their entirety.

BACKGROUND ART

In recent years, wireless sensor nodes have become a high-profile technology. Sensor nodes are expected to be utilized in various fields such as smart houses and plant factories because of their wireless feature.

As such a wireless sensor, there is an associated sensor controller (refer to Patent Document 1, for example). The sensor controller disclosed in Patent Document 1 realizes power saving in terminal group units.

Also, there is a related sensor system (refer to Patent Document 2, for example). In the sensor system described in Patent Document 2, when one sensor detects an abnormality, environmental changes in other sensors can also be measured in detail. A measurement communicator with power generation which includes a power generator, a power storage, and a communicator, and performs control of changing a communication interval according to the amount of power generation is also known (see Patent Document 3, for example).

Also, in recent years, there has been a demand for shortening communication intervals and transmitting a measured value when environmental changes occur in wireless sensor nodes.

PRIOR ART DOCUMENTS

Patent Documents

[Patent Document 1] Japanese Unexamined Patent Application, First Publication No. 2012-198715
[Patent Document 2] Japanese Unexamined Patent Application, First Publication No. 2010-224701
[Patent Document 3] Japanese Unexamined Patent Application, First Publication No. 2003-346271

SUMMARY OF INVENTION

Problems to be Solved by the Invention

However, in the sensor systems described in Patent Documents 1 and 2, a battery is provided or operation is started after the user has charged the battery in advance. When there is a battery, it takes time and labor for a user to replace the battery when the battery life expires. Also, when starting operation after charging the battery, it takes time and labor for the user to charge the battery. In addition, in the sensor system described in Patent Document 2, when one sensor detects an abnormality, environmental changes in other sensors are also measured in detail, so power is consumed in the measurements and transmission of the measurement values, and thus power consumption increases.

In the communicator described in Patent Document 3, the communication interval is changed according to the power generation amount for energy balance between the power generation amount and the power consumption amount. However, when an environmental power generator with low generation power such as a sensor node is used, it is not easy to promptly recover the communicator from a state in which the energy balance is lost.

The invention has been made in consideration of the above-described problems and is directed to providing a sensor node, having an environmental power generator with low power, capable of transmitting a measured value when an environmental change occurs while maintaining energy balance between the power generation amount and the power consumption amount, and a method of controlling the sensor node.

Means for Solving the Problems

To achieve the above-described objects, a sensor node according to an aspect of the invention includes: a first to nth (n is an integer equal to or greater than two) environmental sensors which are configured to acquire ambient environmental information; a transmitter that is configured to regularly issue ambient environmental information acquired by at least one of the second to nth environmental sensors at a predetermined cycle and is configured to irregularly issue ambient environmental information acquired by the first environmental sensor and ambient environmental information acquired by at least one of the second to nth environmental sensors; a detector that is configured to detect a change value of ambient environmental information acquired by the first environmental sensor greater than a first threshold value; and a transmission interval controller that is configured to control a timing at which the transmitter regularly and irregularly issues the ambient environmental information, wherein power is constantly supplied from a power storage to the first environmental sensor, the transmission interval controller, and the detector when storage capacitance of the power storage is equal to or greater than a predetermined level, and wherein the transmission interval controller is configured to: control a timing of sensing by the second to nth environmental sensor within the predetermined cycle and a timing of issuing by the transmitter to cause the transmitter to perform the regular issuance; and control a timing of sensing by the second to nth environmental sensor and a timing of issuing by the transmitter to cause the transmitter to perform the irregular issuance, according to a predetermined condition, when the change value greater than the first threshold value is detected by the detector.

The sensor node according to an aspect of the invention may further include a power feeding switch configured to switch an ON/OFF state of power supply from the power storage to the second to nth environmental sensor and the transmitter, and the transmission interval controller may be configured to: control, when causing the transmitter to perform the regular issuance, the power feeding switch so that power is supplied from the power storage to the second to nth environmental sensors and the transmitter to cause the transmitter to perform the regular issuance; and control, when causing the transmitter to perform the irregular issuance, the power feeding switch so that power is supplied from the power storage to the second to nth environmental sensors and the transmitter to cause the transmitter to perform the irregular issuance.

In the sensor node having such a configuration, when the storage capacitance of the power storage is equal to or greater than a predetermined level, power is constantly supplied from the power storage to the first environmental sensor, the detector, and the transmission interval controller to operate them continuously. The transmission interval controller controls the power feeding switch to supply power from the power storage to the second to nth environmental sensors and the transmitter at a predetermined cycle to cause the transmitter to regularly issue at least ambient environmental information acquired by each of the second to nth sensors. Also, when the detector detects that the change value of the ambient environmental information acquired by the first environmental sensor is greater than the first threshold, the transmission interval controller controls the power feeding switch, according to a predetermined condition, to be switched to a state in which power is supplied from the power storage to the second to nth environmental sensors and the transmitter to cause the transmitter to irregularly issue the ambient environmental information acquired by each of the first to nth environmental sensors.

Accordingly, the sensor node can transmit a measured value when an environmental change occurs while maintaining energy balance between the power generation amount and the power consumption amount.

In the sensor node according to an aspect of the invention, in the predetermined condition, when the change value greater than the first threshold value is detected more than once within the predetermined cycle, power may be supplied to the second to nth environmental sensors and the transmitter to cause the transmitter to perform the irregular issuance only for the case in which the change value greater than the first threshold value is detected for the first time.

As described above, when the change value of the output of the first environmental sensor greater than the first threshold value is detected more than once within a predetermined cycle, the sensor node can cause the transmitter to perform irregular issuance only when the change value of the output of the first environmental sensor greater than the first threshold value is detected first at the largest environmental change. Thus, the sensor node can reduce the number of irregular issuance and reduce power consumption of the power storage.

In the sensor node according to an aspect of the invention, in the predetermined condition, when the change value greater than the first threshold value is detected more than once within a period corresponding to two cycles of the predetermined cycle, power may be supplied to the second to nth environmental sensors and the transmitter to cause the transmitter to perform the irregular issuance only for the case in which the change value greater than the first threshold value is detected for the first time.

As described above, when the change value greater than the first threshold value is detected more than once within a period corresponding to two cycles of the predetermined cycle, the sensor node can cause the transmitter to perform irregular issuance only for the case in which the change value greater than the first threshold value is detected for the first time. Thus, the sensor node can reduce the number of irregular issuance and reduce power consumption of the power storage.

In the sensor node according to an aspect of the invention, a period in which the transmission interval controller supplies power to the second to nth environmental sensors and the transmitter at a time other than the predetermined cycle may be in accordance with the predetermined cycle.

As described above, in the sensor node, cycle of irregular issuance can be flexibly changed according to a predetermined cycle at which regular issuance is performed.

In the sensor node according to an aspect of the invention, in a first period corresponding to the predetermined cycle and a second period corresponding to the predetermined cycle after the first period, when the irregular issuance is not performed in the first period and when the change value of ambient environmental information acquired by the first environmental sensor is detected to be greater than the first threshold value in the second period, the irregular issuance may be performed.

Thus, the sensor node can reduce the number of irregular issuance and reduce power consumption of the power storage.

In the sensor node according to an aspect of the invention, the first environmental sensor may be a human sensor configured to detect presence of a person.

Thus, the sensor node can perform irregular issuance when the human sensor detects presence of a human.

In the sensor node according to an aspect of the invention, power may be supplied to the first to nth environmental sensor, the transmitter, the transmission interval controller, and the detector by the power storage to which generated power of a power generator performing environmental power generation is stored, and when remaining power or a voltage value of the power storage is within a predetermined value, the transmission interval controller may change an interval in which the regular issuance is performed.

Thus, in the sensor node, when the power storage amount of the power storage decreases, the cycle in which regular issuance is performed can be lengthened and the power consumption of the power storage can be reduced.

To achieve the above-described objects, a method of controlling a sensor node using a first to nth (n is an integer equal to or greater than two) environmental sensors which are configured to acquire ambient environmental information, a transmitter that is configured to regularly issue at least ambient environmental information acquired by each of the second to nth environmental sensors at a predetermined cycle, and irregularly issues ambient environmental information acquired by each of the first to nth environmental sensors, a detector that is configured to detect a change value of ambient environmental information acquired by the first environmental sensor greater than a first threshold value, and a transmission interval controller that is configured to control a timing at which the transmitter regularly and irregularly issues the ambient environmental information, the method including: constantly supplying power by a power storage to the first environmental sensor, the transmission interval controller, and the detector when storage capacitance of the power storage is equal to or greater than a predetermined level; controlling, by the transmission interval controller, a timing of sensing by the second to nth environmental sensor within the predetermined cycle and a timing of issuing by the transmitter to cause the transmitter to perform the regular issuance; and controlling a timing of sensing by the second to nth environmental sensor and a timing of issuing by the transmitter by the transmission interval controller to cause the transmitter to perform the irregular issuance, according to a predetermined condition, when the change value greater than the threshold value is detected by the detector.

The method of controlling sensor node according to an aspect of the invention may further include using a power feeding switch configured to switch an ON/OFF state of power supply from the power storage to the second to nth environmental sensor and the transmitter, wherein when causing the transmitter to perform the regular issuance, the power feeding switch may be controlled by the transmission interval controller to supply power from the power storage to the second to nth environmental sensors and the transmitter to cause the transmitter to perform the regular issuance, and when causing the transmitter to perform the irregular issuance, the power feeding switch may be controlled by the transmission interval controller to supply power from the power storage to the second to nth environmental sensors and the transmitter to cause the transmitter to perform the irregular issuance.

Accordingly, the sensor node can transmit a measured value when an environmental change occurs while maintaining energy balance between the power generation amount and the power consumption amount.

Effects of the Invention

According to a sensor node according to an aspect of the invention, in a sensor node having an environmental power generator with low power, it is possible to transmit a measured value when an environmental change occurs while maintaining energy balance between the power generation amount and the power consumption amount.

EMBODIMENTS FOR CARRYING OUT THE INVENTION

Hereinafter, an embodiment of the invention will be described with reference to the drawings.

Figure 1:
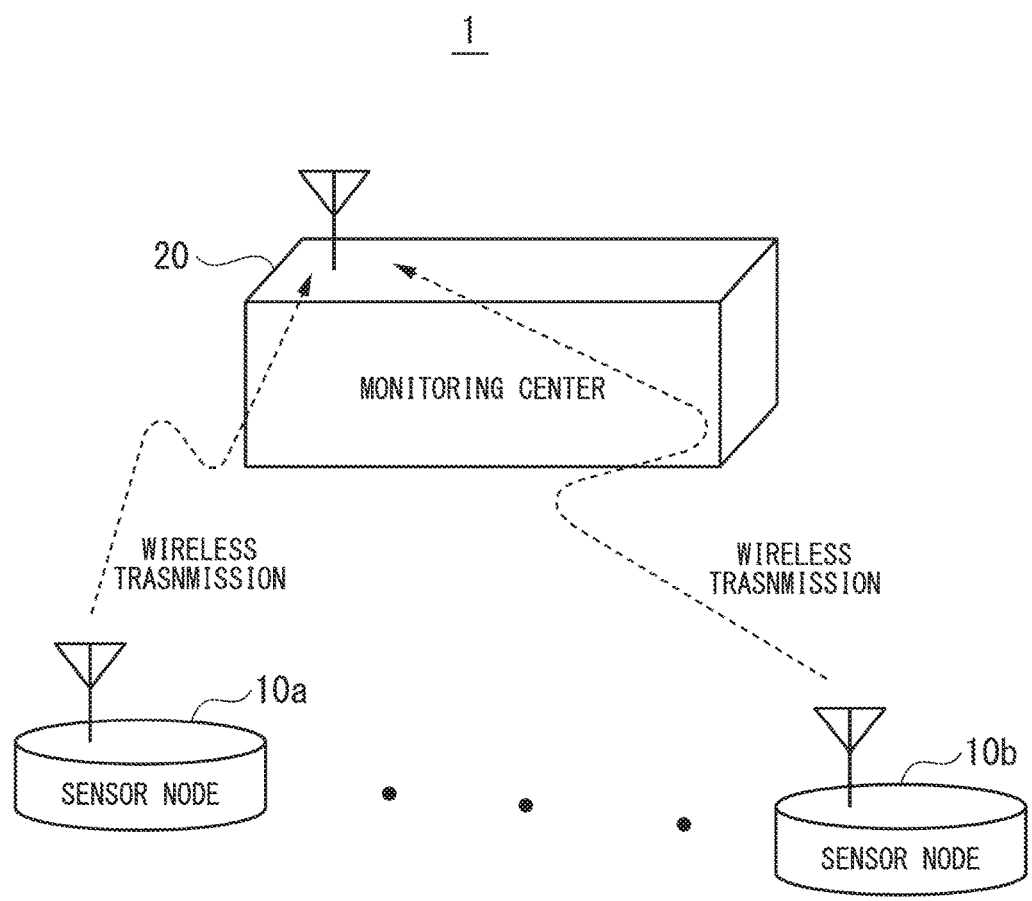
FIG. 1 is an explanatory diagram showing an overview of a wireless sensor system according to an embodiment of the invention.

FIG. 1 is an explanatory diagram showing an overview of a wireless sensor system 1 according to the embodiment of the invention. As shown in FIG. 1, the wireless sensor system 1 includes a monitoring center 20 and sensor nodes 10a and 10b. The monitoring center 20 collects a measurement result of an ambient environment around the sensor nodes 10a and 10b and performs calculation processing or the like on the collected measurement result. The sensor nodes 10a and 10b wirelessly transmit the measurement result to the monitoring center 20.

Here, the measurement result is information detected by the sensor nodes 10a and 10b and includes information indicating a temperature, humidity, $CO_2$ concentration, vibration, water level, illuminance, voltage, current, sound, image, or the like. Also, the measurement result includes the result of determining presence or absence of a person using a human sensor such as an infrared sensor. In addition, the sensor nodes 10a and 10b may be a stationary device, or they may be a wall-mounted device or a device that is stuck to a wall.

Since the sensor nodes 10a and 10b operate with power supply being supplied by energy harvest (environmental power generation) power supply and do not require power supply wires or the like to be laid, the sensor nodes 10a and 10b have a high degree of freedom in placement.

In addition, although two sensor nodes 10a and 10b are shown as the sensor nodes in FIG. 1, the number of sensor nodes may be one or three or more.

Also, the sensor node 10a and the sensor node 10b have the same configuration, and when referring to either one or both, it will be described as a sensor node 10 in the following description.

Figure 2:
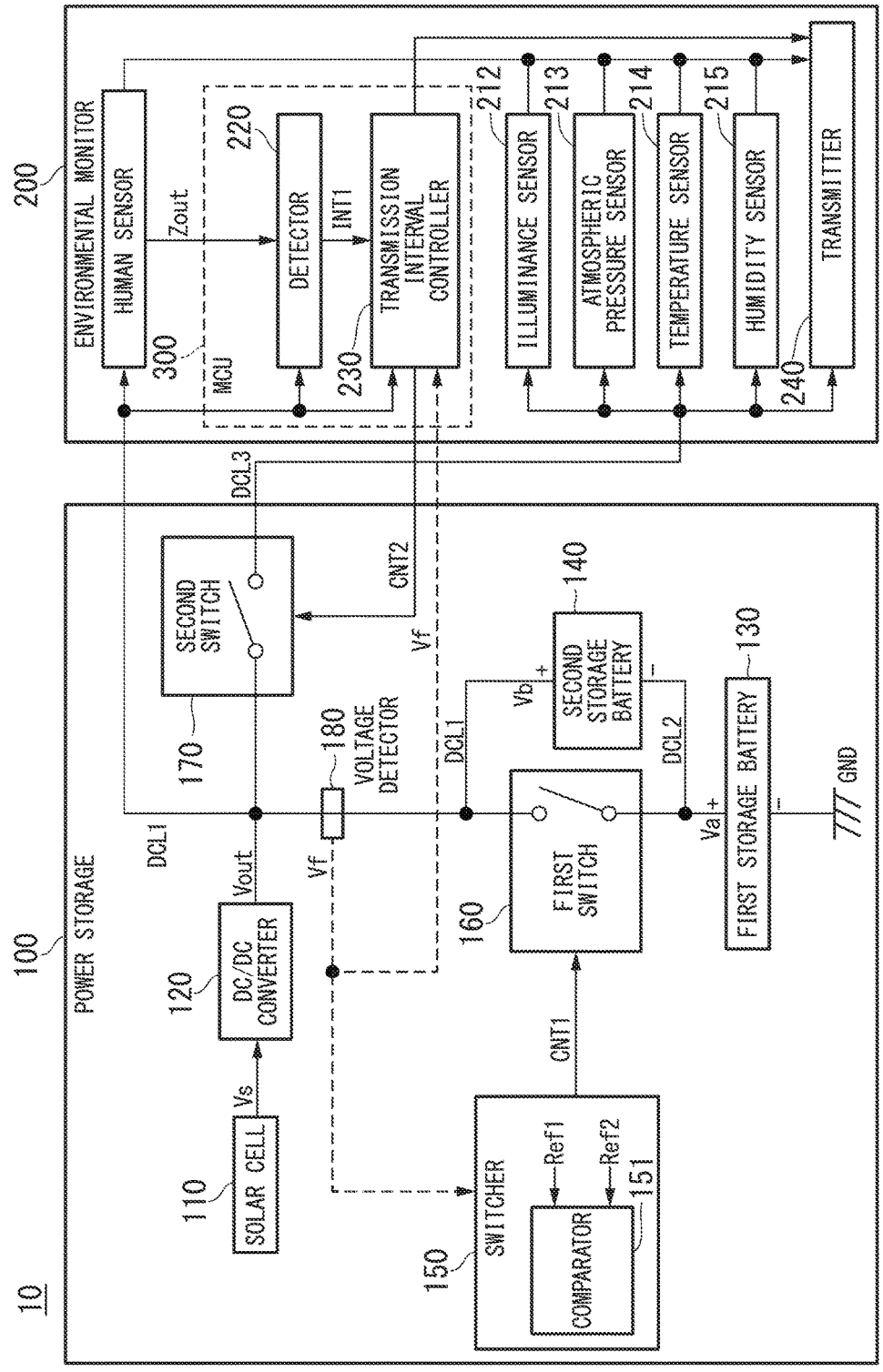
FIG. 2 is a configuration diagram showing a configuration example of a sensor node according to the embodiment of the invention.

FIG. 2 is a configuration diagram showing a configuration example of the sensor node 10 according to the embodiment of the invention. This sensor node 10 is a sensor node installed indoors such as in an office, for example, and is a sensor node to which power is supplied by sunlight or indoor-light photovoltaic power generation.

As shown in FIG. 2, the sensor node 10 is configured with a power storage 100 which stores power generated from a solar cell 110 (a power generator performing environmental power generation) performing environmental power generation in a storage battery, and an environmental monitor 200 which is fed with power from the power storage 100.

The environmental monitor 200 includes a human sensor 211 (a first environmental sensor), an illuminance sensor 212, an atmospheric pressure sensor 213, a temperature sensor 214, a humidity sensor 215, a detector 220, a transmission interval controller 230, and a transmitter 240. The human sensor 211, the illuminance sensor 212, the atmospheric pressure sensor 213, the temperature sensor 214, and the humidity sensor 215 are environmental sensors which acquire information on an ambient environment where the respective sensors are disposed.

The human sensor 211 detects the presence of a person in an office when the sensor node 10 is installed indoors such as in an office, for example. The human sensor 211, for example, is a power saving type motion sensor which detects the variation amount of infrared light when a person having a temperature difference from the surroundings (a person who causes a difference between the surrounding temperature and the body temperature) moves, and detects a wide range of human body movements while having low power consumption. In addition, the human sensor 211 is not limited to the motion sensor, and may be an infrared sensor capable of detecting a stationary human body or a sensor detecting the presence of a person from image information of a digital camera or the like.

Also, the illuminance sensor 212 is a sensor configured to detect ambient room brightness. The atmospheric pressure sensor 213 is a sensor configured to detect an ambient atmospheric pressure in the room. The temperature sensor 214 is a sensor configured to detect an ambient room temperature. The humidity sensor 215 is a sensor configured to detect ambient room humidity.

The environmental monitor 200 wirelessly and regularly issues (transmits) environmental information including information on presence (or absence) of a person detected by the human sensor 211, information on room illuminance detected by the illuminance sensor 212, information on a room atmospheric pressure detected by the atmospheric pressure sensor 213, information on a room temperature detected by the temperature sensor 214, and information on room humidity detected by the humidity sensor 215 to the external monitoring center 20.

In addition, the environmental monitor 200 irregularly issues (transmits) the above-described environmental information to the external monitoring center 20 wirelessly according to a predetermined condition to be described below.

(Description of Power Storage 100)

First, the power storage 100 will be described. Also, a charging/discharging operation or the like in the power storage 100 is not directly related to an operation of the sensor node according to the embodiment of the invention. Therefore, the configuration and operation of the power storage 100 will be briefly described.

The power storage 100 supplies power to the environmental monitor 200 to operate the environmental monitor 200. The power storage 100 includes the solar cell 110 using an environmental power generator, a direct current/direct current converter (a DC/DC converter) 120, a first storage battery 130, a second storage battery 140, a switcher 150, a first switch 160, a second switch 170 (a power feeding switch), and a voltage detector 180.

The solar cell 110 is a solar cell for low illuminance and may be a solar cell used at illuminance of 10000 (Lux) or lower, for example. In the embodiment, a power generation capacity of the solar cell 110 is approximately 200 to 500 (μW) when the brightness of an electric lamp is approximately 200 lux. The solar cell 110 charges the first storage battery 130 and the second storage battery 140 and supplies power to the environmental monitor 200 while the electric lamp is turned on in an office or the like. An input side of the DC/DC converter 120 is connected to an output side of the solar cell 110.

An output voltage Vs of the solar cell 110 is input to the DC/DC converter 120. The DC/DC converter 120 converts the input voltage Vs into a voltage corresponding to the power feeding voltage to the environmental monitor 200.

The DC/DC converter 120 outputs the converted voltage to a power feeding line DCL 1 and charges the first storage battery 130 or a series circuit of the first storage battery 130 and the second storage battery 140.

The first storage battery 130 is a lithium ion capacitor (LIC), for example, and is a high capacitance lithium ion capacitor of 40 F (farads) having higher capacitance than the second storage battery 140, for example.

The second storage battery 140 is a capacitor having capacitance lower than the capacitance of the first storage battery 130 and is an electric double layer capacitor (EDLC) of 1 F (farad), for example.

When the first switch 160 is in an on (ON) state, power generated from the solar cell 110 is supplied to the first storage battery 130 via the DC/DC converter 120 while the electric lamp is turned on in an office or the like.

Also, the first storage battery 130 supplies power that has been charged therein to the environmental monitor 200 when the solar cell 110 is not generating power or when a power generation amount of the solar cell 110 is lower than a power consumption amount of the environmental monitor 200. For example, the first storage battery 130 supplies power that has been charged therein to the environmental monitor 200 when the first switch 160 is in an ON state while the electric lamp is turned off in an office or the like.

The power storage 100 is configured to be able to drive the environmental monitor 200 for approximately 60 hours continuously, for example, on the power stored in the first storage battery 130. In addition, when an operation of the environmental monitor 200 is temporarily stopped due to a drop in charging voltage Va of the first storage battery 130 in a state in which the power feeding from the solar cell 110 is stopped, the power storage 100 is configured so that the operation of the environmental monitor 200 can be restored in approximately ten minutes after the power generation of the solar cell 110 is restarted.

Also, in the power storage 100, for the purpose of preventing the cell of the lithium ion capacitor of the first storage battery 130 from being degraded, the charging voltage Va of the first storage battery 130 is set not to be a voltage value lower than 2.5 V (an over-discharge determination value) so that the charging voltage Va of the first storage battery 130 does not reach an over-discharge state. Therefore, when the charging voltage of the first storage battery 130 is in a state close to the over-discharge state of 2.5 V, the power storage 100 stops the supply of power from the first storage battery 130 to the environmental monitor 200. When the power supply voltage supplied from the power storage 100 is 2.5 V or lower, for example, the environmental monitor 200 stops its operation.

Here, when only the first storage battery 130 is recharged to a predetermined voltage value to restore the operation of the environmental monitor 200 by the first storage battery 130, the following points need to be taken into consideration.

For example, it is necessary to prevent the occurrence of repeated operations of the recharging of the first storage battery 130 by the solar cell 110, restoration of the operation of the environmental monitor 200, drop in charging voltage Va of the first storage battery 130 due to the restart of the environmental monitor 200, and the consequent operation stop of the environmental monitor 200 due to the drop of charging voltage Va. Therefore, in the power storage 100, the voltage at which power supply to the environmental monitor 200 is started is set to 2.7 V (an operation restoration voltage), for example. In accordance with this, the environmental monitor 200 restores its operation when the power supply voltage is 2.7 V or higher.

However, in the power storage 100, since a charging current that can be supplied from the solar cell 110, which is an environmental power generating element, to the first storage battery 130 is as small as several tens of μA or the like, when the first storage battery 130 with a capacitance of 40 F is charged from 2.5 V to 2.7 V, a long charging time such as several hours is required. For this reason, environmental monitor 200 has a problem that the operation stops for several hours when the first storage battery 130 is recharged.

Therefore, in the power storage 100 according to the embodiment, the second storage battery 140 and the first switch 160 which serves as a switching mechanism are used together with the first storage battery 130. In a normal state in which the first storage battery 130 is 2.5 V (over-discharge determination value) or higher, for example, the power storage 100 short-circuits both ends of the second storage battery 140 by the first switch 160 so that charging and discharging are performed using only the first storage battery 130. Also, when the charging voltage Va of the first storage battery 130 becomes lower than 2.5 V, the power storage 100 stops the supply of power to the environmental monitor 200 and turns off the first switch 160 to connect the second storage battery 140 with the first storage battery 130 in series.

Thereafter, when power generation is performed by the solar cell 110, the solar cell 110 causes the charging current to flow through the series circuit of the first storage battery 130 and the second storage battery 140. In this case, since the second storage battery 140 has remarkably small capacitance compared to the capacitance of the first storage battery 130, the charging voltage of the second storage battery 140 rapidly increases due to the charging current from the solar cell 110. Therefore, the charging voltage Vb of the series circuit of the first storage battery 130 and the second storage battery 140 can reach the 2.7 V (operation restoration voltage), which is the voltage needed to restore the operation of the environmental monitor 200, in a short time. As a result, the power storage 100 can restore the environmental monitor 200 in a short time (approximately ten minutes, for example).

Next, an operation of each unit of the power storage 100 will be described.

The first switch 160 is connected in parallel to the second storage battery 140. The first switch 160 short-circuits both sides of the second storage battery 140 when it is in the ON state (a closed state) and releases both ends of the second storage battery 140 from the short-circuited state when it is in the OFF state (an open state).

Also, when the first switch 160 is in the ON state, that is, when both ends of the second storage battery 140 are short-circuited, the power feeding line DCL 1 and a power feeding line DCL 2 are connected, and a positive electrode (+) terminal of the first storage battery 130 is directly connected to the power feeding line DCL 1 via the first switch 160. When the first switch 160 is in the ON state, the charging voltage Va of the first storage battery 130 is output to the power feeding line DCL 1.

On the other hand, when the first switch 160 is in the OFF state, the first storage battery 130 and the second storage battery 140 are connected in series. Also, when the first switch 160 is in the OFF state, the voltage Vb of the positive electrode (+) terminal of the second storage battery 140 is output to the power feeding line DCL 1. The voltage Vb at the positive electrode (+) terminal of the second storage battery 140 is the charging voltage Vb of the series circuit of the first storage battery 130 and the second storage battery 140 and is a voltage obtained by adding the charging voltage of the second storage battery 140 and the charging voltage Va of the first storage battery 130.

The first switch 160 is in either the ON or OFF state according to instruction content of a control signal CNT 1 input from the switcher 150.

The voltage detector 180 is configured, for example, using a resistance voltage-dividing circuit and detects a voltage Vout of the power feeding line DCL 1. The voltage detector 180 outputs a voltage detection signal Vf of the voltage Vout of the power feeding line DCL 1 to the switcher 150. The voltage detected by the voltage detector 180 is the voltage Va of the first storage battery 130 when the first switch 160 is in the ON state and is voltage Vb of the second storage battery 140 when the first switch 160 is in the OFF state.

The switcher 150 includes a comparator 151. The switcher 150 controls the ON/OFF state of the first switch 160. The comparator 151 compares the voltage detection signal Vf of the voltage Vout of the power feeding line DCL 1 input from the voltage detector 180 with predetermined reference voltages Ref 1 and Ref 2 of its own unit. The switcher 150 outputs the control signal CNT 1 for turning on/off the first switch 160 (opening and closing) to the first switch 160 according to a comparison result in the comparator 151.

When the comparator 151 determines that the voltage Vout of the power feeding line DCL 1 is equal to or lower than 2.5 V (over-discharge determination value), the switcher 150 outputs the control signal CNT1 for turning off the first switch 160. Also, after the switcher 150 outputs the control signal CNT 1 for turning off the first switch 160, when the comparator 151 determines that the voltage Vout of the power feeding line DCL 1 is equal to or higher than 2.7 V (operation restoration voltage), the switcher 150 outputs the control signal CNT1 for turning on the first switch 160. That is, the switcher 150 has a hysteresis characteristic of 0.2 V width between 2.5 V and 2.7 V and controls the opened/closed state of the first switch 160.

Specifically, when the first switch is in the ON state, the comparator 151 compares the voltage detection signal Vf of the voltage Vout of the power feeding line DCL 1 with the predetermined reference voltage Ref 1. The reference voltage Ref 1 corresponds to the voltage 2.5 V (over-discharge determination value) used when determining that the first storage battery 130 approaches the over-discharge state. In the ON state of the first switch 160, the comparator 151 compares the voltage detection signal Vf of the power feeding line DCL 1 with the predetermined reference voltage Ref 1, thereby determining whether or not the voltage Va of the first storage battery 130 is 2.5 V or lower. Also, when the voltage Va of the first storage battery 130 is 2.5 V or lower, the switcher 150 outputs the control signal CNT 1 to the first switch 160 to turn off the first switch 160, thereby connecting the first storage battery 130 and the second storage battery 140 in series. Accordingly, the power storage 100 stops charging the first storage battery 130 and power feeding from the first storage battery 130 to the environmental monitor 200.

In addition, when the first switch 160 is in the OFF state, the comparator 151 compares the voltage detection signal Vf of the voltage Vout of the power feeding line DCL 1 with the predetermined reference voltage Ref 2. The reference voltage Ref 2 corresponds to the voltage 2.7 V (operation restoration voltage) used when determining whether or not the power storage 100 is restored to the normal state from a state in which charging from the solar cell 110 to the first storage battery 130 and power feeding from the first storage battery 130 to the environmental monitor 200 have been stopped.

When the first switch 160 is in the OFF state, the comparator 151 compares the voltage detection signal Vf of the power feeding line DCL 1 with the predetermined reference voltage Ref 2, thereby determining whether the voltage Vb of the second storage battery 140 is 2.7 V or higher. Also, when the voltage Vb of the second storage battery 140 is equal to or higher than 2.7 V, the switcher 150 turns on the first switch 160 to place both ends of the second storage battery 140 in a short-circuited state and to directly connect the positive electrode (+) terminal of the first storage battery 130 to the power feeding line DCL 1. Accordingly, charging of the first storage battery 130 and power feeding from the first storage battery 130 to the environmental monitor 200 are resumed in the power storage 100.

In addition, one terminal of the second switch 170 is connected to the power feeding line DCL 1 and the other terminal is connected to the illuminance sensor 212, the atmospheric pressure sensor 213, the temperature sensor 214, the humidity sensor 215, and a power input terminal of the transmitter 240 in the environmental monitor 200 via a power feeding line DCL 3. Accordingly, the second switch 170 connects or opens the power feeding line DCL 1 and the power feeding line DCL 3. The second switch 170 is controlled to be in an ON state or in an OFF state according to instruction content of a control signal CNT 2 input from the transmission interval controller 230 of the environmental monitor 200 to be described below. Also, when the second switch 170 is in the ON state, the power feeding line DCL 1 and the power feeding line DCL 3 are connected and the power storage 100 supplies power to the illuminance sensor 212, the atmospheric pressure sensor 213, the temperature sensor 214, the humidity sensor 215, and the transmitter 240 in the environmental monitor 200. In the embodiment, the power feeding switch (the second switch 170) is controlled such that power is supplied from the power storage 100 to the second to nth environmental sensors (the illuminance sensor 212, the atmospheric pressure sensor 213, the temperature sensor 214, and the humidity sensor 215) and the transmitter 240, and thereby the timing of sensing by the second to nth environmental sensors and the timing of issuance by the transmitter are controlled.

In addition, when the storage capacitance decreases, the switch may be provided such that power is not necessarily provided for the human sensor 211 which is the first environmental sensor, the transmission interval controller 230, and the detector 220. That is, as shown in FIG. 2, a state of power supply refers to a state in which power is supplied to the illuminance sensor 212, the atmospheric pressure sensor 213, the temperature sensor 214, the humidity sensor 215, and the transmitter 240 by the second switch 170, or a state in which power is individually supplied to each sensor and each functional unit by providing a switch individually between the human sensor 211 and the power supply, the illuminance sensor 212 and the power supply, the atmospheric pressure sensor 213 and the power supply, the temperature sensor 214 and the power supply, the humidity sensor 215 and the power supply, the detector 220 and the power supply, and the transmitter 240 and the power supply. Here, the power supply refers to at least one of the solar cell 110, the DC/DC converter 120, the first storage battery 130, and the second storage battery 140.

(Description of Environmental Monitor 200)

Next, the environmental monitor 200 will be described.

In FIG. 2, the environmental monitor 200 operates by receiving power supplied from the power storage 100. In the environmental monitor 200, the human sensor 211, the detector 220, and the transmission interval controller 230 receive power supply constantly from the power feeding line DCL 1 of the power storage 100 and operate continuously. On the other hand, the illuminance sensor 212, the atmospheric pressure sensor 213, the temperature sensor 214, the humidity sensor 215, and the transmitter 240 receive power supply from the power storage 100 and operate only when the second switch 170 is in the ON state and enter a sleep state when the second switch 170 is in the OFF state.

The human sensor 211, the illuminance sensor 212, the atmospheric pressure sensor 213, the temperature sensor 214, and the humidity sensor 215 are configured by measuring instruments or detectors according to the application purpose of the sensor node 10. In addition, the illuminance sensor 212, the atmospheric pressure sensor 213, the temperature sensor 214, and the humidity sensor 215 may be referred to simply as "illuminance sensor and the like 212 to 215" in the following description.

The illuminance sensor and the like 212 to 215 perform measurement according to the control of the transmission interval controller 230 and output information indicating the acquired measurement results to the transmitter 240. The measurement by the illuminance sensor and the like 212 to 215 is performed in accordance with the timing at which the transmitter 240 issues environmental information to the monitoring center 20, for example. In addition, the human sensor 211 constantly and continuously operates, and always detects the presence of a human.

The transmitter 240 regularly issues information indicating presence (or absence) of a human detected by the human sensor 211 and information measured by the illuminance sensor and the like 212 to 215 as environmental information at a predetermined cycle and interruptively issues the information (irregular issuance) according to a predetermined condition to be described below. The transmitter 240 encodes and modulates the environmental information and sensor node identification ID (an identification code of the sensor node) to generate a transmission signal and wirelessly issues (transmits) the transmission signal as the environmental information.

In addition, much of the power consumption in the environmental monitor 200 is spent on transmission power when the transmitter 240 performs wireless transmission. Also, in the embodiment, the transmitter 240 not having a wireless receiving function is described as reducing the power consumption, but the invention is not necessarily limited thereto, and the receiving function can be provided in the transmitter 240 in a desired case.

The detector 220 detects whether an output Zout of the human sensor 211 changes from "0" (Low) to "1" (High), for example. When the detector 220 detects that the output Zout of the human sensor 211 is changed from "0" (Low) to "1" (High), the detector 220 outputs an interruptive issuance request INT 1 requesting interruptive issuance (irregular issuance) to the transmission interval controller 230.

Also, the output Zout "0" from the human sensor 211 may be described as "human sensor output Zout=0" and the output Zout "1" from the human sensor 211 may be described as "human sensor output Zout=1" in some cases.

The transmission interval controller 230 controls the timing to cause the transmitter 240 to perform regular issuance and interruptive issuance. The transmission interval controller 230 controls the second switch 170 (power feeding switch) to supply power from the power storage 100 to the illuminance sensor and the like 212 to 215 and the transmitter 240 to cause the transmitter 240 to perform regular issuance at a predetermined cycle, for example, every 300 sec (seconds). Also, when the interruptive issuance request INT 1 is input from the detector 220, the transmission interval controller 230 controls the second switch 170 to supply power from the power storage 100 to the illuminance sensor and the like 212 to 215 and the transmitter 240 to cause the transmitter 240 to perform interruptive issuance according to a predetermined condition.

Also, an example in FIG. 2 shows supply and stop of power to the illuminance sensor and the like 212 to 215 (environmental sensors excluding the human sensor 211) and the transmitter 240 by turning on/off the second switch 170. The invention is not limited thereto, and in the sensor node 10, the second switch 170 may be omitted and an ON/OFF switch may be provided in each of the illuminance sensor and the like 212 to 215 (sensors excluding the human sensor 211) and the transmitter 240. This ON/OFF switch is controlled by the transmission interval controller 230. In this case, when a power storage amount of the power storage 100 is small, the transmission interval controller 230 can make a selection such as not to acquire information of a specific environmental sensor.

In addition, the environmental monitor 200 can be configured to include a microcontroller such as a micro control unit (MCU) 300, for example. Thus, the detector 220 and the transmission interval controller 230 can implement a part or all of the functions using the microcontroller. In other words, the microcontroller can implement the functions of the detector 220 and the transmission interval controller 230 by reading and executing a program recorded on a recording medium such as a ROM (not shown in the figure). Also, functions of respective processing units in the environmental monitor 200 may be implemented by dedicated hardware.

(Description of an Example in Which the Transmission Interval Controller 230 and the Detector 220 are Implemented Using the MCU 300)

Figure 3:
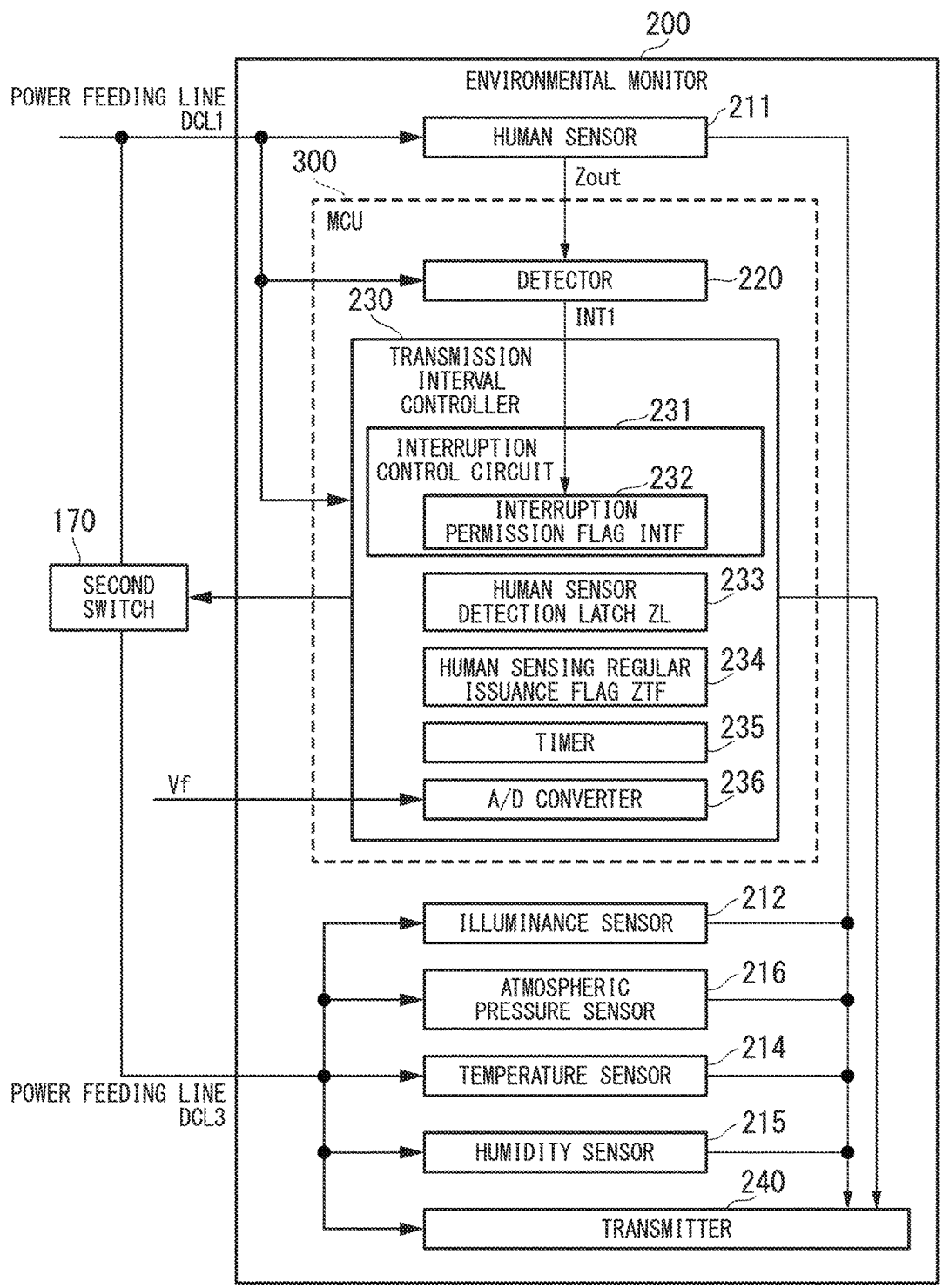
FIG. 3 is a configuration diagram showing a configuration example of an environmental monitor according to the embodiment of the invention.

FIG. 3 is a configuration diagram showing a configuration example of the environmental monitor 200 according to the embodiment of the invention. In the environmental monitor 200 shown in FIG. 3, the transmission interval controller 230 and the detector 220 are implemented using the MCU (microcontroller) 300. Also, the transmission interval controller 230 is configured to include an interruption control circuit 231, an interruption permission flag (INTF) 232, a human sensor detection latch (ZL) 233, a human sensing regular issuance flag (ZTF) 234, a timer 235, and an analog/digital (A/D) converter 236.

Also, in the following description, the human sensor detection latch (ZL) 233 will be described as "human sensor detection latch ZL", the human sensing regular issuance flag (ZTF) 234 will be described as "human sensing regular issuance flag ZTF", and the interruption permission flag (INTF) 232 will be described as "interruption permission flag INTF".

The interruptive issuance request INT 1 requesting the interruptive issuance (irregular issuance) is input to the interruption control circuit 231 from the detector 220. When the output Zout of the human sensor 211 changes from "0" to "1", the detector 220 detects the change from "0" to "1" and outputs the interruptive issuance request INT 1 requesting interruptive issuance to the transmission interval controller 230.

Also, when the interruption permission flag INTF is set to "1", the interruption control circuit 231 accepts the interruptive issuance request INT 1 from the detector 220. Also, the value set in the interruption permission flag INTF is a signal obtained by logically inverting the output signal "0" or "1" of the human sensor detection latch ZL.

The human sensor detection latch ZL is a latch circuit for storing detection of the presence of a human by the human sensor 211. When the output Zout of the human sensor 211 is shifted from "0" to "1", this human sensor detection latch ZL is set to "1". Once the human sensor detection latch ZL is set to "1", it is reset only when the output Zout of the human sensor 211 is "0" in the timing of the regular issuance.

An output signal of the human sensor detection latch ZL is used to limit the number of the interruptive issuance to one in a period of one regular issuance. Also, a state in which the human sensor detection latch ZL is set to "1" may be described as "human sensor detection latch ZL=1" and a state in which the human sensor detection latch ZL is set to "0" may be described as "human sensor detection latch ZL=0" in some cases.

In addition, the output signal of the human sensor detection latch ZL is used as "human detection information" when issuing environmental information. Also, when the information of "human sensor detection latch ZL=1" is issued as human detection information, it may be described as "human detection information=1", and when the information of "human sensor detection latch ZL=0" is issued as human detection information, it may be described as "human detection information=0" in some cases.

The human sensing regular issuance flag ZTF is a flag for storing that the "human detection information=1" has been transmitted in regular issuance of environmental information. The human sensing regular issuance flag ZTF is used to restrict the interruptive issuance to at most one per twice of the regular issuances. Also, a state in which the human sensing regular issuance flag ZTF is set to "1" may be described as "human sensing regular issuance flag ZTF=1" and a state in which the human sensing regular issuance flag ZTF is set to "0" may be described as "human sensing regular issuance flag ZTF=0" in some cases.

A setting and resetting conditions with the human sensing regular issuance flag ZTF will be described in a timing chart to be described below.

Also, the timer 235 is a timer in which 300 sec. is set as a standard measuring value and measures the timing of the regular issuance at intervals of 300 sec. In addition, the A/D converter 236 converts the voltage detection signal Vf of the voltage Vout of the power feeding line DCL 1 from an analog signal into a digital signal and takes it as a digital value. When the transmission interval controller 230 determines according to the voltage detection signal Vf that the amount of power stored in the power storage 100 has become small and the voltage Vout of the power feeding line DCL 1 falls within a predetermined value (within 2.7 V, for example), the transmission interval controller 230 changes the interval of the regular issuance to be longer than 300 sec, for example, 400 sec. or the like (Description of an Example in Which a Sensor Measurement Value Changes when a Person Enters a Room)

Figure 4:
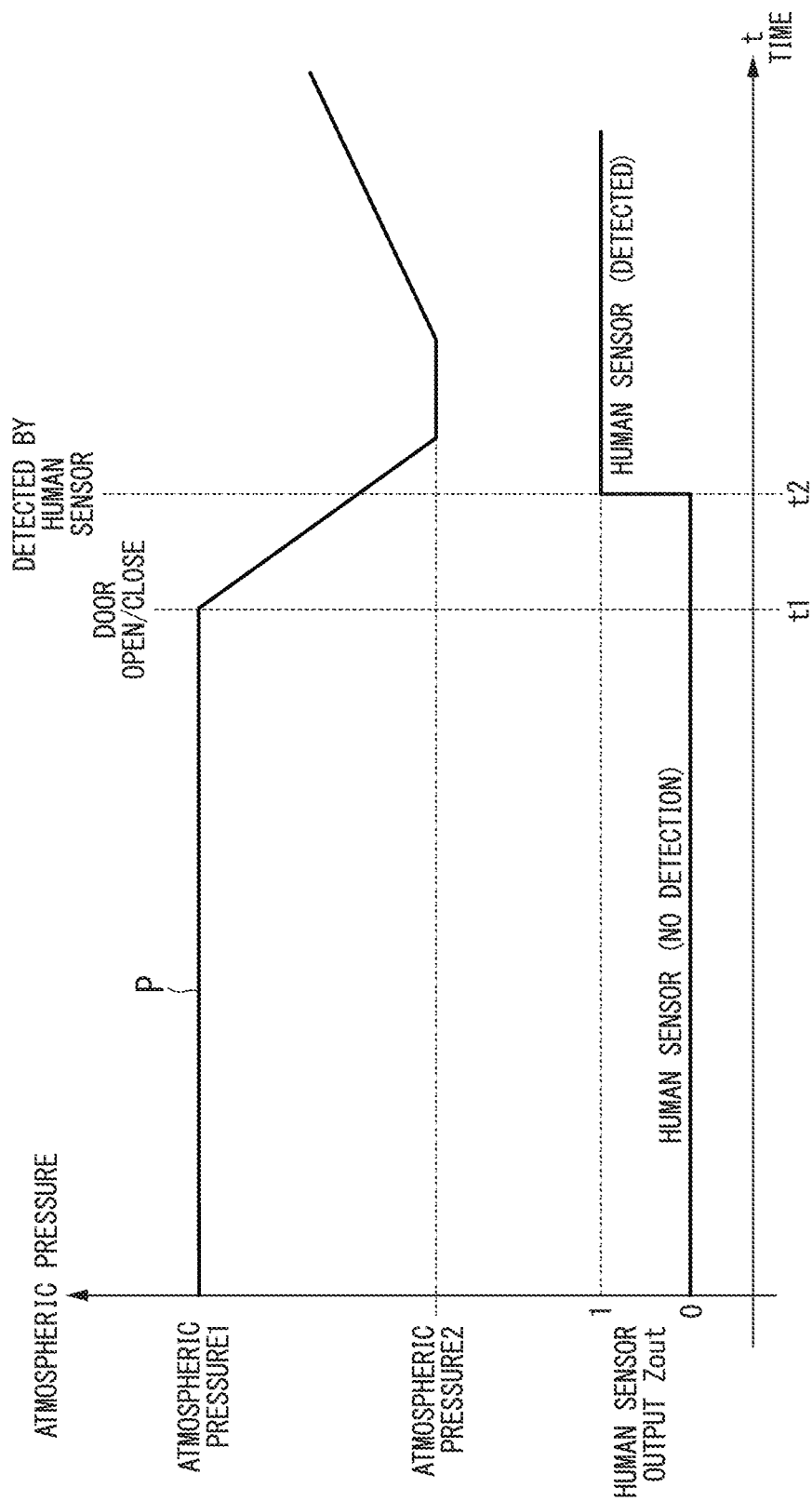
FIG. 4 is an image diagram showing an example in which a sensor measurement value changes when a person enters a room.

FIG. 4 is an image diagram showing an example in which a sensor measurement value changes when a person enters a room. In FIG. 4, elapsed time t is shown in the horizontal direction, and a change in atmospheric pressure in the room and a change in the human sensor output Zout when a person enters the room by opening and closing the door are shown in the vertical direction in combination. FIG. 4 shows a state in which the door is opened and closed and a person enters the room at the time of t1 in a state in which there is no human in the room or someone is present at a region that the human sensor 211 cannot detect before the time t1. Also, FIG. 4 shows a state in which a human is present in the room after time t1. Even when a human opens and closes a door and leaves the room, the atmospheric pressure in the room and the detection output of the human sensor change.

Also, as shown in FIG. 4, the atmospheric pressure P in the room detected by the atmospheric pressure sensor 213 is at a stable value of an atmospheric pressure 1 before the time t1. Since the door is opened and closed at the time t1, the atmospheric pressure sensor 213 temporarily decreases drastically to an atmospheric pressure 2. Thereafter, the atmospheric pressure gradually returns to the atmospheric pressure 1. In addition, the drastic change in atmospheric pressure caused by a person entering and exiting is not limited to "decreasing" but may also be "increasing". Also, even when the door is closed after a person enters, the atmospheric pressure is not limited to "returning to the atmospheric pressure before the door was opened or returning to the original state".

Then, the output Zout of the human sensor 211 detects the presence of a human at time t2 which is a little later than the time t1 by a person entering and moving in the room after opening and closing the door at the time t1. That is, before the time t2, the output Zout of the human sensor 211 is "0" indicating that presence of a human has not been detected, and after the time T2, the output Zout of the human sensor 211 is "1" indicating that movement and presence of a human has been detected.

When presence of a human has been detected by the human sensor 211, the sensor node 10 interruptively issues the environmental information including the measurement information of the illuminance sensor and the like 212 to 215 and human detection information (=1) to the monitoring center 20 at a timing at which a predetermined condition to be described below is satisfied.

In a case in which the human sensor 211 detects the presence of a human immediately after the time t1, the data acquisition timing by the atmospheric pressure sensor 213 may be slightly delayed and, for example, the measurement may be performed at the timing t2.

(Description of an Example of Environmental Information Issued from the Sensor Node 10 to the Monitoring Center 20)

Figure 5:
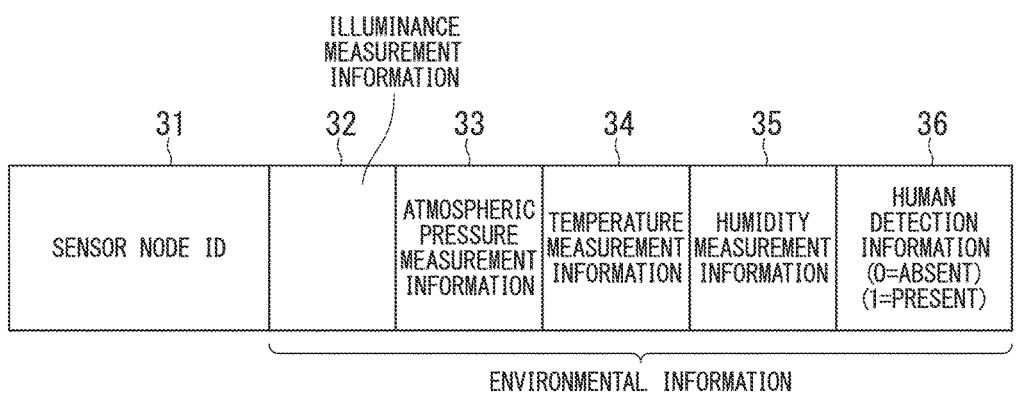
FIG. 5 is an explanatory diagram showing an example of environmental information issued from a sensor node to a monitoring center according to the embodiment of the invention.

FIG. 5 is an explanatory diagram showing an example of environmental information issued from the sensor node 10 to the monitoring center 20 according to the embodiment. As shown in FIG. 5, the environmental information which is regularly or interruptively issued from the sensor node 10 to the monitoring center 20 is issued together with a sensor node ID (identification information) 31. The environmental information includes illuminance measurement information 32, atmospheric pressure measurement information 33, temperature measurement information 34, temperature measurement information 35, and the human detection information (1 or 0).

The human detection information included in the environmental information is not the output Zout of the human sensor 211 but the output signal of the human sensor detection latch ZL.

Also, the transmission interval controller 230 may not transmit the human detection information at the time of regular issuance, but may be configured to transmit the human detection information at the time of irregular issuance. In addition, the transmission interval controller 230 may be configured to transmit selected measurement data of predetermined environmental information as the environmental information instead of transmitting all of the measurement data of the illuminance sensor and the like 212 to 215.

(Description of Operation Timing of the Sensor Node 10)

Figure 6:
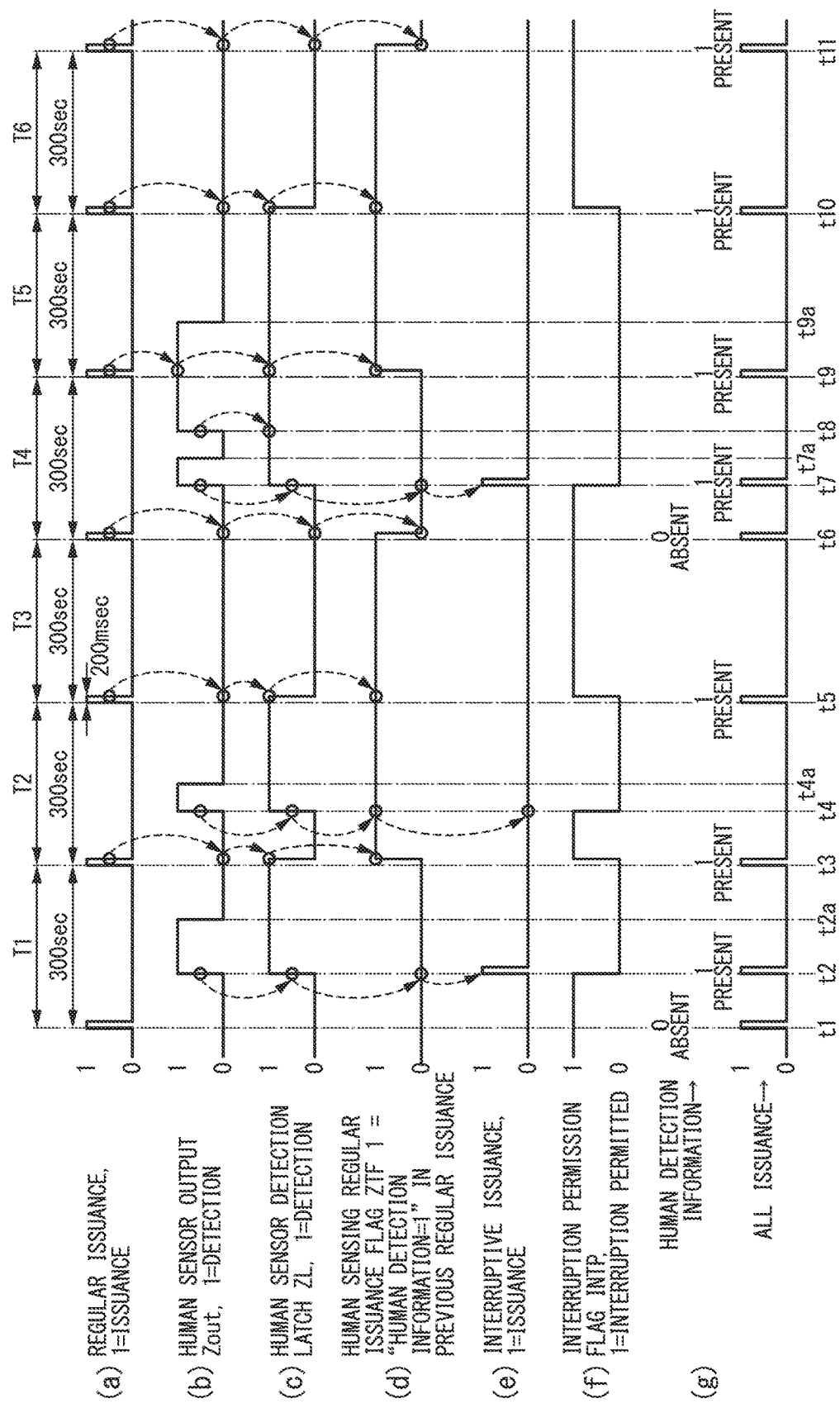
FIG. 6 is a first timing chart showing an operation of a sensor node according to the embodiment of the invention.

FIG. 6 is a first timing chart showing an operation of the sensor node 10 according to the embodiment of the invention.

FIG. 6 shows elapsed time in the horizontal direction, and in the vertical direction, the regular issuance performed every 300 sec by the transmitter 240 ((a) in FIG. 6), an output Zout of the human sensor ((b) in FIG. 6), an output of the human sensor detection latch ZL ((c) in FIG. 6), a setting value of the human sensing regular issuance flag ZTF ((d) in FIG. 6), interruptive issuance ((e) in FIG. 6), a setting value of the interruption permission flag INTF ((f) in FIG. 6), and all issuance ((g.) in FIG. 6) are shown in combination.

In FIG. 6, the regular issuance shown in (a) shows timing of the regular issuance which is regularly issued every 300 sec.

In FIG. 6, the output Zout of the human sensor shown in (b) shows an output signal of the human sensor 211. "0" indicates that the human sensor 211 has not detected presence of a human, and "1" indicates that the human sensor 211 has detected presence of a human. In a state in which the human sensor 211 is always detecting the presence of a human, when presence of a human is detected, the output of the human sensor 211 is "1", and when presence of a human is not detected, the output of the human sensor 211 is "0".

In FIG. 6, the human sensor detection latch ZL shown in (c) is an output signal of the human sensor detection latch ZL which stores detection of the presence of a human by the human sensor 211. As a condition for setting from "0" to "1", the human sensor detection latch ZL is set from "0" to "1" in synchronism with the rise of the output Zout of the human sensor from "0" to "1". In other words, the human sensor detection latch ZL is asynchronously set with the timing of the regular issuance. In addition, as a condition for resetting from "1" to "0", the human sensor detection latch ZL is reset from "1" to "0" when the output Zout of the human sensor is "0" at the end of regular issuance. In other words, the human sensor detection latch ZL is reset in synchronism with the timing of regular issuance.

In addition, the human sensor detection latch ZL is used as human detection information when regular issuance or interruptive issuance (irregular issuance) is performed. In other words, the human detection information included in the environmental information is "human detection information (=1; present)" when the "human sensor detection latch ZL=1", and is "human detection information (=0; absent)" when the "human sensor detection latch ZL=0".

In addition, in FIG. 6, the human sensing regular issuance flag ZTF shown in (d) is a signal indicating that "human detection information=1" has been transmitted in the regular issuance. This human sensing regular issuance flag ZTF is the signal indicating that the "human detection information=1" has been transmitted in the immediately preceding regular issuance, and the human sensing regular issuance flag ZTF is used to restrict the interruptive issuance (irregular issuance) to at most once for every two regular issuances.

As a condition for setting from "0" to "1", the human sensing regular issuance flag ZTF is set from "0" to "1" when "human sensor detection latch ZL=1" at the end of the regular issuance. That is, the human sensing regular issuance flag ZTF is set in synchronism with the end timing of the regular issuance.

Also, as a condition for resetting from "1" to "0", the human sensing regular issuance flag ZTF is reset from "1" to "0" when "human sensor detection latch ZL=0" at the end of the regular issuance. That is, the human sensing regular issuance flag ZTF is reset in synchronism with the end timing of the regular issuance. In other words, the setting and resetting of the human sensing regular issuance flag ZTF is performed in synchronism with the regular issuance.

In FIG. 6, the interruptive issuance shown in (e) indicates the timing at which the interruptive issuance is performed.

In FIG. 6, the interruption permission flag INTF shown in (f) is a signal obtained by logically inverting the output "0" of the human sensor detection latch ZL to "1" and "1" to "0", and interruption of the interruptive issuance request INT 1 is permitted when it is "1" and is not permitted when it is "0".

Also, in FIG. 6, all issuance shown in (g) indicates the timings of both the regular issuance and the interruptive issuance. In addition, in (g) of FIG. 6, the issuance indicated as "0 (absent)" indicates that "human detection information=0" is issued in the environmental information, and the issuance indicated as "1 (present)" indicates that "human detection information=1" is issued in the environmental information.

Hereinafter, an aspect of issuance information issued from the sensor node 10 will be described with reference to FIG. 6.

As shown in (a), the environmental monitor 200 repeats the regular issuance every 300 sec, which is a predetermined cycle, after performing the regular issuance at time t1. That is, after the regular issuance is performed at the time t1, the environmental monitor 200 performs the regular issuance at a time t3 after 300 sec have passed since the time t1 and performs the regular issuance at a time t5 after 300 sec have passed since the time t3. In the same manner, the environmental monitor 200 performs regular issuance at subsequent timings every time 300 sec pass after the regular issuance is performed at the time t5, that is, at times t6, t9, and the like. In this regular issuance, a wireless signal transmitted to the monitoring center 20 is a signal whose signal duration is approximately 200 msec, for example. A wireless signal transmitted to the monitoring center 20 in the irregular issuance shown in (e) also is approximately 200 msec which is the same as that of the regular issuance.

A period T1 is a period between the time t1 at which the regular issuance is performed and the time t3 at which the next regular issuance is performed. The period T1 indicates an example in which the human sensor 211 detects the presence of a human and performs interruptive issuance. That is, the period T1 is a human detection interruptive issuance period.

At the time t1 in the period T1, as shown in (b), since the human sensor 211 does not sense presence of a person, the human sensor output Zout is "0". At the time t1, as shown in (c), the human sensor detection latch ZL is "0". Also, as shown in (d), the human sensing regular issuance flag ZTF is set to "0", and as shown in (f), the interruption permission flag INTF is set to "1" indicating interruption permission.

Then, since "human sensor detection latch ZL=0", the environmental information regularly issued to the monitoring center 20 at the time of t1 is "measurement information of illuminance, atmospheric pressure, temperature, humidity+human detection information (=0)".

Then, at the time t2 after the time t1, presence of a human is detected by the human sensor 211 and the output Zout of the human sensor 211 changes from "0" to "1". The state in which the human sensor 211 detected presence of a human continues until time t2a after the time t2.

Then, at time t2, the detector 220 detects that the human sensor output Zout has changed from "0" to "1" and outputs the interruptive issuance request INT 1 to the transmission interval controller 230. In this time t2, "human sensor detection latch ZL=0" and "human sensing regular issuance flag ZTF=0". Therefore, the transmission interval controller 230 starts the interruptive issuance. In addition, the transmission interval controller 230 sets the human sensor detection latch ZL to "1".

As described above, the period T1 is an example of a period in which the first "human sensor output Zout=1" is detected at the time t2 after the regular issuance at the time t1. Therefore, the interruptive issuance is performed at the time t2 and the environmental information transmitted by this interruptive issuance is "measurement information of illuminance, atmospheric pressure, temperature, humidity+human detection information (=1)".

Thereafter, at the time t2a, the presence of a person is no longer detected by the human sensor 211, and the output Zout of the human sensor 211 shifts from "1" to "0". However, the human sensor detection latch ZL is maintained at "1" without change.

Then, at the timing at which the regular issuance at the time t3 is performed, the environmental monitor 200 again performs the regular issuance. At the time t3, the human sensor output Zout is "0" while "human sensor detection latch ZL=1". Therefore, the environmental information issued in the regular issuance at the time t3 is "measurement information of illuminance, atmospheric pressure, temperature, humidity+human detection information (=1)".

Then, at the end of the regular issuance at the time t3, the human sensing regular issuance flag ZTF for storing that "human detection information (=1)" has been issued in the regular issuance is set to "1" in the transmission interval controller 230. Furthermore, since the human sensor output Zout is "0", the transmission interval controller 230 resets the human sensor detection latch ZL to "0". In addition, the transmission interval controller 230 sets the interruption permission flag INTF to "1".

The following period T2 is a period between the time t3 at which the regular issuance is performed and the time t5 at which the next regular issuance is performed. This period T2 is an example of a period in which the human sensor 211 continues to detect the presence of a person even in the period T2 after the human sensor 211 has detected the presence of a person and performed an interruptive issuance in the previous period T1. That is, the period T2 is a period in which "human detection information=1" is issued at the regular issuance immediately after not performing the interruptive issuance at the time of continuous human detection. When the human sensor 211 detects the presence of a person in this period T2, the environmental monitor 200 does not issue interruptive issuance for power saving and issues the human detection information in the immediately following regular issuance.

More specifically, at time t4 after at the time t3 at which the previous regular issuance is performed, the human sensor 211 again detects the presence of a person, and the output Zout of the human sensor 211 becomes "1" again. This state in which the human sensor 211 detected the presence of a person continues until time t4a after the time t4. In other words, initial "human sensor output Zout=1" is obtained at the present time (the time t4) from the regular issuance at the previous time t3.

At this time t4, the output Zout of the human sensor 211 changes from "0" to "1". However, the environmental monitor 200 does not perform an interruptive issuance. This is because the human sensing regular issuance flag ZTF is "1" and information of "human detection information=1" has already been transmitted at the time of regular issuance at the time t3. Therefore, the transmission interval controller 230 limits interruptive issuance of the "human detection information=1" which continues within a predetermined time period to reduce power consumption. Furthermore, at the time t4, the human sensor detection latch ZL is set from "0" to "1". In FIG. 6, the predetermined time period is 600 sec.

As described above, in the transmission interval controller 230, in the period T1 of the immediately previous regular issuance and the period T2 of the present regular issuance, when presence of a person is continuously detected by the human sensor 211 for a predetermined time, interruptive issuance is not performed in the present period T2 and "human detection information=1" is issued in the regular issuance at the immediately following time t5. Specifically, in the example shown in FIG. 6, when presence of a person is detected more than once within a period of 300 sec., the transmission interval controller 230 permits interruptive issuance only for the first time when presence of a person is detected.

Also, as in the period from the time t1 to the time t5, when presence of a person is continuously detected every 300 sec. and the interruptive issuance is performed in the first cycle, the transmission interval controller 230 does not permit interruptive issuance when presence of a person is detected for the second time in succession.

The subsequent period T3 is a period between the time t5 at which the regular issuance is performed and the time t6 at which the next regular issuance is performed. The period T3 is an example of human non-detection period in which the human sensor 211 does not detect presence of a person. That is, the period T3 is a period for resetting the human sensing regular issuance flag ZTF by the regular issuance immediately after the human non-detection period.

More specifically, at the time t5, the timing of regular issuance is reached. The environmental information at the time t5 is "measurement information of illuminance, atmospheric pressure, temperature, humidity+human detection information (=1)" because "human sensor detection latch ZL=1".

At the end of the regular issuance at the time t5, the transmission interval controller 230 maintains the "human sensing regular issuance flag=1" without change and, since the output Zout of the human sensor 211 is "0", resets the human sensor detection latch ZL from "1" to "0".

Subsequently, at the time t6, the timing of regular issuance is reached.

In the regular issuance at the time t6, since "human sensor detection latch ZL=0", the environmental information issued by the regular issuance is "measurement information of illuminance, atmospheric pressure, temperature, humidity+human detection information (=0)".

Then, at the end of the regular issuance at the time t6, the transmission interval controller 230 resets as "human sensing regular issuance flag ZTF=0" and, since "human sensor detection latch ZL=0", maintains this "human sensor detection latch ZL=0" without change.

As described above, the period T3 is the human non-detection period in which the human sensor 211 does not detect presence of a person. In the period T3, the transmission interval controller 230 does not issue interruptive issuance and resets the human sensing regular issuance flag ZTF to "0" in the regular issuance at the immediately following time t6. As a result, the transmission interval controller 230 can release the state of "human detection information=1" to be issued in the next regular issuance. That is, the transmission interval controller 230 can release the state of prohibiting interruptive issuance.

The subsequent period T4 is a period between the time t6 at which the regular issuance is performed and the time t9 at which the next regular issuance is performed. This period T4 shows an example in which the human sensor 211 detects the presence of a person twice but the interruptive issuance is limited to one in this one period of T4. That is, the period T4 is a period in which interruptive issuance is limited to one in one period of regular issuance.

More specifically, at time t7 after the time t6, the human sensor 211 detects the presence of a person and the output Zout of the human sensor 211 is changed from "0" to "1".

At the time t7, "human sensor detection latch ZL=0" and "human sensing regular issuance flag ZTF=0". Therefore, the transmission interval controller 230 starts interruptive issuance. Furthermore, the transmission interval controller 230 sets as "human sensor detection latch ZL=1". Then, the environmental information issued by the interruptive issuance at the time t7 is "measurement information of illuminance, atmospheric pressure, temperature, humidity+human detection information (=1)".

Subsequently, the output Zout of the human sensor 211 becomes "0" temporarily at time t7a after the time t7, and the output Zout of the human sensor 211 again becomes "1" at time t8 after the time t7a.

At the time t8, the output Zout of the human sensor 211 changes from "0" to "1", but since the "human sensor detection latch ZL=1", the transmission interval controller 230 does not perform interruptive issuance. In addition, the transmission interval controller 230 maintains the "human sensor detection latch ZL=1" without change.

Thus, in the period T4, when the interruptive issuance has already been performed once, even when the output Zout of the human sensor 211 again changes from "0" to "1", the transmission interval controller 230 does not issue interruptive issuance within a predetermined time. Accordingly, when the human sensor 211 detects the presence of a person more than once in one regular issuance cycle, the transmission interval controller 230 can restrict the number of times of interruptive issuance to once by the human sensor detection latch ZL.

The subsequent period T5 is a period between the time t9 at which the regular issuance is performed and time t10 at which the next regular issuance is performed. This period T5 is an example of a period during which presence of a person is continuously detected by the human sensor 211 from the time t8 in the previous period T4 after the regular issuance at the time t9. That is, the period T5 is a period in which "human detection information=1" is issued in the regular issuance immediately after not performing an interruptive issuance at the time of continuous detection of presence of a person. In other words, it is an example in which "human sensor output Zout=1" continues from the time t8 to the time t9a. In the period T5, since the "human sensing regular issuance flag ZTF=1", the transmission interval controller 230 does not perform interruptive issuance. In this case, the transmission interval controller 230 issues information of "human detection information=1" in the regular issuance at the immediately following time t10.

More specifically, at the time t9, the timing of regular issuance is reached. In the regular issuance at the time t9, since "human sensor detection latch ZL=1", the environmental information issued by the regular issuance is "measurement information of illuminance, atmospheric pressure, temperature, humidity+human detection information (=1)".

Then, at the end of the regular issuance at the time t9, the transmission interval controller 230 sets the "human sensing regular issuance flag ZTF=0" to "human sensing regular issuance flag ZTF=1".

Subsequently, while "human sensor output Zout=1" continues until the time t9a, since "human sensor detection latch ZL=1" and "human sensing regular issuance flag ZTF=1", the transmission interval controller 230 does not issue interruptive issuance.

As described above, in the period T5 from the time t9 to the time t10, the state of "human sensor output Zout=1" continues from the time t8 (the previous period T4 (a first period corresponding to a predetermined cycle)) to the time t9a (the present period T5 (a second period corresponding to a predetermined cycle and after the first period). However, the transmission interval controller 230 does not issue interruptive issuance in the period T5 for power saving, and issues "human detection information=1" in the regular issuance at the immediately following time t10.

The subsequent period T6 is a period between the time t10 at which the regular issuance is performed and time t11 at which the next regular issuance is performed. The period T6, as in the period T3, is an example of human non-detection period in which the human sensor 211 does not detect presence of a person. That is, the period T6, as in the period T3 are periods for resetting the human sensing regular issuance flag ZTF in the regular issuance immediately after the of human non-detection period.

More specifically, at the time t10, the timing of regular issuance is reached. In the regular issuance at the time t10, since "human sensor detection latch ZL=1", the environmental information issued by the regular issuance is "measurement information of illuminance, atmospheric pressure, temperature, humidity+human detection information (=1)".

Then, at the end of the regular issuance at the time t10, the transmission interval controller 230 resets the "human sensor detection latch ZL=1" to "human sensor detection latch ZL=0" because "human sensor output Zout=0". Also, the transmission interval controller 230 maintains the state of the "human sensing regular issuance flag ZTF=1" without change.

Subsequently, at the time t11, the timing of regular issuance is reached.

In the regular issuance at the time t11, since "human sensor detection latch ZL=0", the environmental information issued by the regular issuance is "measurement information of illuminance, atmospheric pressure, temperature, humidity+human detection information (=0)".

Then, at the end of the regular issuance at the time t11, the transmission interval controller 230 resets the "human sensing regular issuance flag ZTF=1" to "human sensing regular issuance flag ZTF=0". As a result, the transmission interval controller 230 can release the state of "human detection information=1" to be issued in the next regular issuance.

Furthermore, as described in FIG. 6, the transmission interval controller 230 sets a condition for interruptive issuance using the human sensor detection latch ZL and the human sensing regular issuance flag ZTF, but the invention is not limited thereto. For example, at the time t2, after the transmission interval controller 230 performs the interruptive issuance by detecting a first change from "0" to "1" in the human sensor output Zout, the transmission interval controller 230 may start a timer to block interruptive issuance for a predetermined time period.

(Description of Another Operation Example of the Sensor Node 10)

Next, another operation example of the sensor node 10 will be described.

Figure 7:
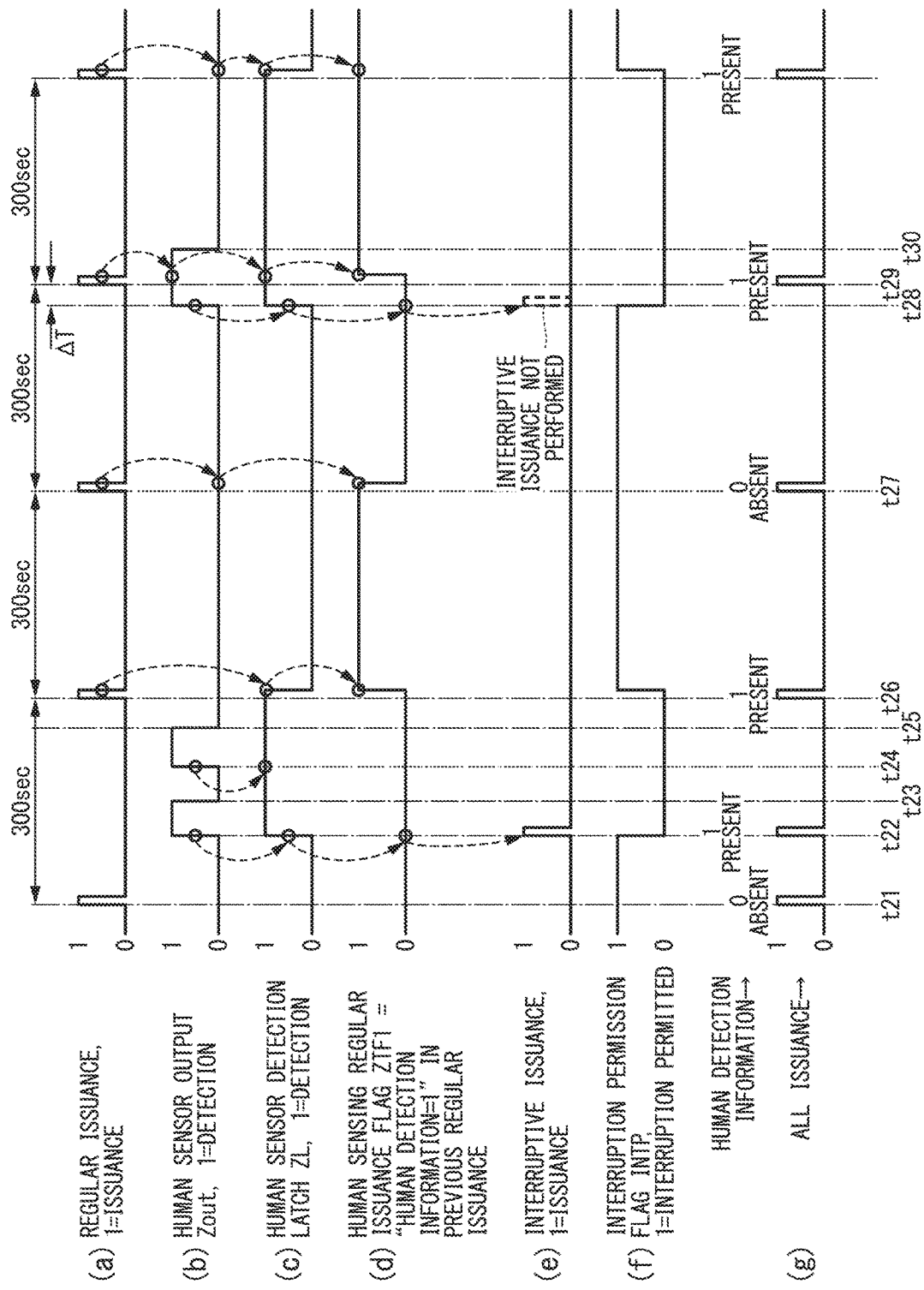
FIG. 7 is a second timing chart showing an operation of a sensor node according to the embodiment of the invention.

FIG. 7 is a second timing chart showing an operation of the sensor node 10 according to the embodiment of the invention.

FIG. 7 shows an example in which the human sensor 211 continues to detect presence of a person twice in a cycle of one regular issuance. In addition, in FIG. 7, an example in which a timing at which presence of a person is detected by the human sensor 211 overlaps a timing of regular issuance is shown.

Hereinafter, aspects of issuance information issued from the sensor node 10 will be described with reference to FIG. 7.

As shown in (a), the environmental monitor 200 regularly issues environmental information to the monitoring center 20 wirelessly at the timing of regular issuance at time t21.

As shown in (b), since the human sensor 211 does not sense presence of a person at the time t21, the human sensor output Zout is "0". Also, as shown in (c), the human sensor detection latch ZL is "0" at the time t11. Also, as shown in (d), the human sensing regular issuance flag ZTF is set to "0", and as shown in (f), the interruption permission flag INTF is set to "1" indicating interruption permission.

Accordingly, the environmental information regularly issued at the time of t21 is "measurement information of illuminance, atmospheric pressure, temperature, humidity+human detection information (=0)".

Then, at time t22 after the time t21, presence of a person is detected by the human sensor 211 and the output Zout of the human sensor 211 changes from "0" to "1". The state in which the human sensor 211 detected presence of a person continues until time t23 after the time t22.

Then, since the human sensor 211 detects the presence of a person at the time t22, the human sensor output Zout changes from "0" to "1". At the time t22, the detector 220 detects that the human sensor output Zout has changed from "0" to "1" and outputs the interruptive issuance request INT 1 to the transmission interval controller 230. In this case, since "human sensor output Zout=0" and "human sensing regular issuance flag ZTF=0", the transmission interval controller 230 starts the interruptive issuance. Also, the transmission interval controller 230 sets "human sensor detection latch ZL=1".

Then, the environmental information by the interruptive issuance at the time t22 is "measurement information of illuminance, atmospheric pressure, temperature, humidity+human detection information (=1)".

Then, at the time t23, the detection of presence of a person by the human sensor 211 is not performed, and the output Zout of the human sensor 211 changes from "1" to "0".

Subsequently, at time t24 after the time t23, the human sensor 211 again detects the presence of a person and thus the human sensor output Zout changes from "0" to "1". This state in which the human sensor 211 detected the presence of a person continues until time t25 after the time t24.

At the time t24, the detector 220 outputs the interruptive issuance request INT 1 to the transmission interval controller 230 due to the change of the human sensor output Zout from "0" to "1", but "human sensor detection latch ZL=1". Thus, the transmission interval controller 230 does not perform interruptive issuance.

Then, when the timing for performing the next regular issuance is reached at time t26 after the time t25, the transmission interval controller 230 performs the regular issuance of the environmental information to the monitoring center 20. At this time t26, "human sensor detection latch ZL=1". Thus, the environmental information issued in the regular issuance at the time t26 is "measurement information of illuminance, atmospheric pressure, temperature, humidity+human detection information (=1)".

Then, at the end of the regular issuance at the time t26, the transmission interval controller 230 resets "human sensing regular issuance flag ZTF=1" and "human sensor detection latch ZL=0".

Accordingly, when the human sensor 211 detects the presence of a person more than once in one regular issuance cycle, the transmission interval controller 230 can restrict the number of times of interruptive issuance to once.

Subsequently, from the time t26 to time t27 of the next regular issuance timing, the human sensor 211 does not detect presence of a person, and thus the human sensor output Zout remains "0" without change. Therefore, the transmission interval controller 230 does not perform interruptive issuance.

Subsequently, at the time t27, regular issuance is performed. In the regular issuance at the time t27, since "human sensor detection latch ZL=0", the environmental information is "measurement information of illuminance, atmospheric pressure, temperature, humidity+human detection information (=0)". Then, at the time at which the regular issuance ends, the human sensing regular issuance flag ZTF is reset to "human sensing regular issuance flag ZTF=0".

Subsequently, at time t28 after the time t27, the human sensor 211 again detects the presence of a person and thus the output Zout of the human sensor 211 changes from "0" to "1". This state in which the human sensor 211 detected presence of a person continues until time t30 past time t29 which is the next regular issuance timing.

Also, in the example shown in FIG. 7, a time difference ΔT between the time t28 at which the output Zout of the human sensor 211 changes from "0" to "1" and the time t29 is assumed to be, for example, within ten seconds.

In this case, at the time t28, "human sensor detection latch ZL=0" and "human sensing regular issuance flag ZTF=0", and thus the condition for generating interruptive issuance is satisfied. Therefore, normally, interruptive issuance is performed at the time t28, and after this interruptive issuance is performed, regular issuance is also performed at the time t29. That is, duplicating environmental information is issued in a short period of time.

As described above, in order to prevent consumption of the power storage amount of the power storage 100 due to the issuance of duplicated information in a short period of time, the transmission interval controller 230 stops the interruptive issuance at the time t28 when the time difference ΔT is small (within 10 sec., for example). Then, in the immediately following regular issuance, the transmission interval controller 230 issues environmental information of "measurement information of illuminance, atmospheric pressure, temperature, humidity+human detection information (=1)".

As a result, the transmission interval controller 230 can limit interruptive issuance and regular issuance from being consecutively issued within a short period of time. Accordingly, the transmission interval controller 230 can prevent unnecessary power consumption of the power storage 100.

As described above, in the sensor node 10 according to the embodiment, when the human sensor 211 detects the presence of a person more than once within one cycle of the regular issuance, the transmission interval controller 230 can restrict to one interruptive issuance by the human sensor detection latch ZL. In addition, the transmission interval controller 230 can restrict to one interruptive issuance per two times of regular issuance at most, for example, by the human sensing regular issuance flag ZTF. Therefore, in the sensor node 10, it is possible to transmit a measured value in real time when an environmental change occurs while maintaining energy balance between the power generation amount and the power consumption amount.

Figure 8:
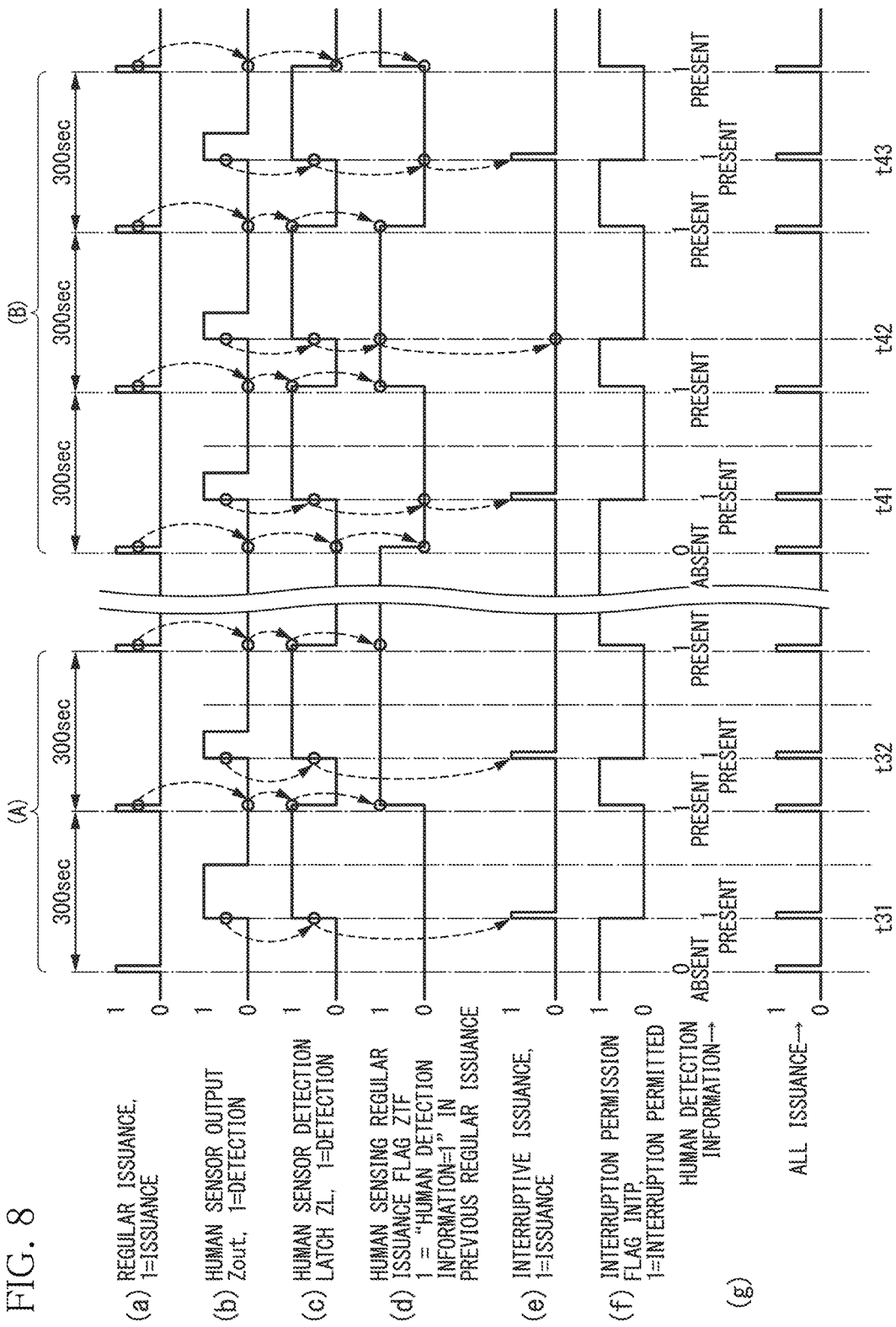
FIG. 8 is an explanatory diagram showing a modified example of the timing of interruptive issuance according to the embodiment of the invention.

In addition, the number of times of interruptive issuance with respect to the number of times of regular issuance is not limited to the above-described example, and the control can be performed by various methods. FIG. 8 is an explanatory diagram showing a modified example of the timing of interruptive issuance according to the embodiment of the invention. For example, as shown in the part (A) of the timing chart of FIG. 8, when the human sensor 211 continues to detect presence of a person every 5 minutes, for example, it is also possible for the transmission interval controller 230 to perform interruptive issuance every five minutes.

In realizing this processing, for example, it can be easily realized by ignoring the condition of the human sensing regular issuance flag ZTF when determining whether to issue interruptive issuance at time t31 and time t32.

Also, as shown in the part (B) of the timing chart of FIG. 8, for example, when the human sensor 211 continuously detects the presence of a person three times for five minutes, it is possible for the sensor node 10 to perform interruptive issuance once in two times. That is, the sensor node 10 performs interruptive issuance when it first detects the presence of a person by the human sensor 211 at time t41. Furthermore, it is possible for the sensor node 10 not to perform interruptive issuance when presence of a person is second detected by the human sensor 211 at time t42 but to perform interruptive issuance when presence of a person is third detected by the human sensor 211 at time t43.

In realizing this processing, as shown in the human sensing regular issuance flag ZTF in (d), it can be easily realized by the transmission interval controller 230 restricting the section of "human sensing regular issuance flag ZTF=1" not to be continuous in two regular issuance cycles.

Also, it is also possible for the transmission interval controller 230 to limit interruptive issuance to be performed once every three times by restricting a width of the period in which "human sensing regular issuance flag ZTF=1". That is, when the human sensor 211 continuously detects the presence of a person, for example, every five minutes, the transmission interval controller 230 can restrict the number of times to issue interruptive issuance to once per arbitrary period of regular issuance by arbitrarily controlling the width of the period in which "human sensing regular issuance flag ZTF=1".

(Description of Processing Procedures in the Sensor Node 10)

Figure 9:
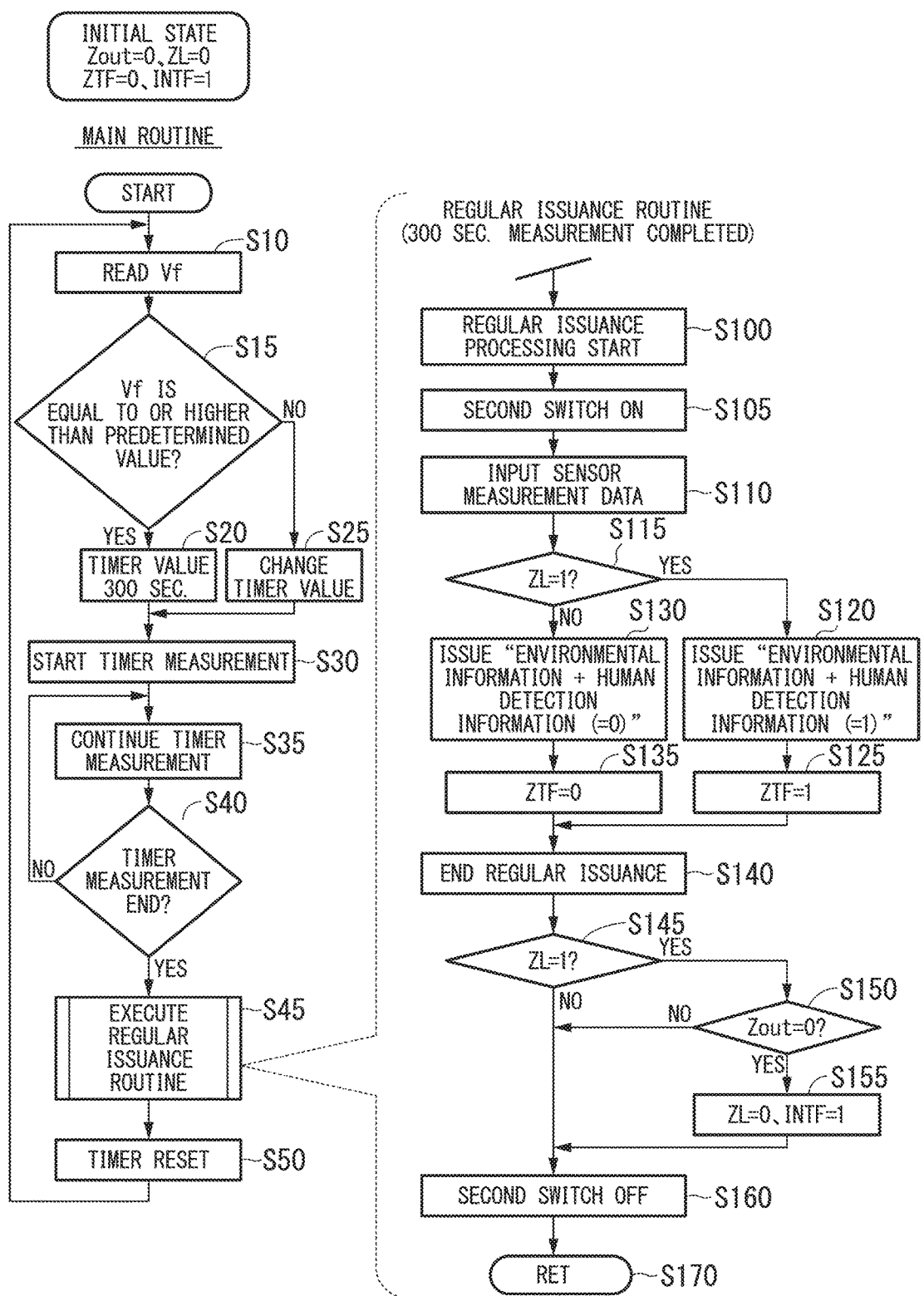
FIG. 9 is a flowchart showing a procedure of processing regular issuance in a sensor node according to the embodiment of the invention.
Figure 10:
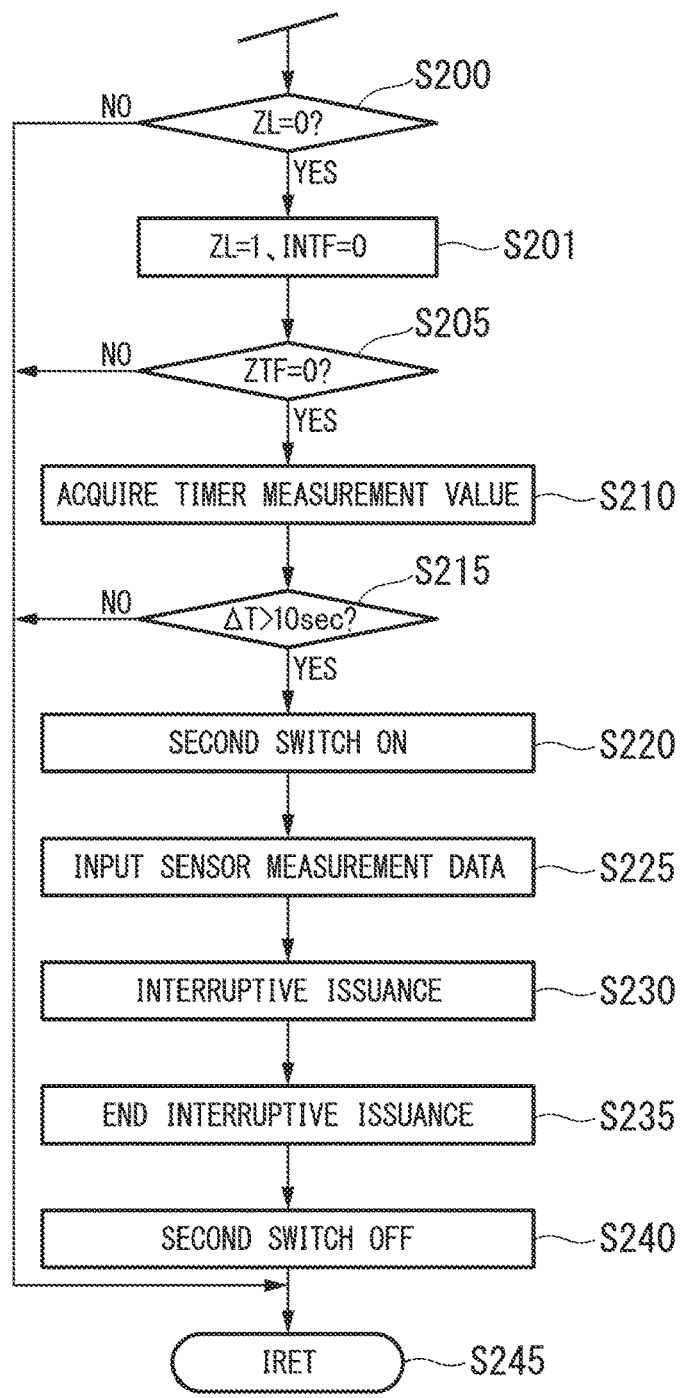
FIG. 10 is a flowchart showing a procedure of processing interruptive issuance in a sensor node according to the embodiment of the invention.

FIG. 9 is a flowchart showing a procedure of processing the regular issuance in the sensor node 10 according to the embodiment of the invention. FIG. 10 is a flowchart showing a procedure of processing the interruptive issuance in the sensor node 10 according to the embodiment of the invention.

First, a flow of processing in the regular issuance will be described with reference to FIG. 9. As an initial state, it is assumed that the human sensor 211 does not detect presence of a person, and the output Zout of the human sensor 211 is "0". Also, in the transmission interval controller 230, it is assumed that "human sensor detection latch ZL=0", "human sensing regular issuance flag ZTF=0", and "interruption permission flag INTF=1". Furthermore, the transmission interval controller 230 constantly executes a main routine for performing regular issuance.

In the main routine, first, the transmission interval controller 230 reads the voltage detection signal Vf of the voltage Vout of the power feeding line DCL 1 by the A/D converter 236 (step S10).

Next, the transmission interval controller 230 determines whether or not the voltage of the power feeding line DCL 1 is equal to or higher than a predetermined value (2.7 V, for example) according to the voltage detection signal Vf (step S15). When the voltage of the power feeding line DCL 1 is determined to be equal to or higher than the predetermined value in step S15 (step S15; YES), the transmission interval controller 230 sets 300 sec., which is a standard value, as a timer value of the timer 235. Thereafter, the process proceeds to step S30, and measurement of the timer 235 is started.

On the other hand, when the voltage of the power feeding line DCL 1 is determined to be not equal to or higher than the predetermined value in step S15 (step S15; NO), the transmission interval controller 230 sets the timer value of the timer 235 to a time longer than 300 sec. (400 sec., for example) (step S25). In this case, the timer value can be set according to the voltage of the power feeding line DCL 1. Thereafter, the process proceeds to step S30, and measurement of the timer 235 is started.

Also, in step S25, it has been described that the timer value of the timer 235 is set to a time longer than 300 sec. when the voltage of the power feeding line DCL 1 is determined to be not equal to or higher than the predetermined value, but the invention is not limited thereto. For example, when a measured value of the luminance is equal to or lower than the threshold value, the next regular issuance interval may be extended (timer value change) in the same manner as when the power storage amount is decreased. In this way, when the interior is dark, on the assumption that people are less coming in and out and change in environment is gentle, the power balance can be improved by extending the issuance interval.

When the timer measurement is started in step S30, subsequently, the transmission interval controller 230 continues the measurement by the timer 235 (step S35).

Next, the transmission interval controller 230 determines whether or not the measurement by the timer 235 is completed (step S40). When the measurement by the timer 235 is not completed (step S40; NO), the process returns to step S35, and the transmission interval controller 230 continues the measurement by the timer 235.

On the other hand, when the measurement by the timer 235 is completed (step S40; YES), the transmission interval controller 230 executes regular issuance routine (step S45). The regular issuance routine is a subroutine with respect to the main routine, and the regular issuance routine will be described below.

When the processing of the regular issuance routine in step S45 is completed, the transmission interval controller 230 proceeds to a processing of step S50 and resets the measurement value of the timer 235 (step S50). After executing the reset processing of the timer measurement value in step S50, the transmission interval controller 230 returns to the processing of step S10 and repeats the above-described processing.

Next, a flow of processing in the regular issuance routine will be described.

When the measurement by the timer 235 is completed (step S40; YES), the transmission interval controller 230 starts the regular issuance processing (step S100).

When the regular issuance processing is started, the transmission interval controller 230 turns on the second switch 170 in the power storage 100 (step S105). Accordingly, power is supplied to the illuminance sensor and the like 212 to 215 and the transmitter 240.

Next, the transmitter 240 inputs information on the measurement data of the illuminance sensor and the like 212 to 215 (step S110).

Next, the transmission interval controller 230 determines whether or not "human sensor detection latch ZL=1" (step S115). When it is determined that "ZL=1" in S115 (step S115; YES), the transmission interval controller 230 instructs the transmitter 240 to issue the information of "measurement information of illuminance, atmospheric pressure, temperature, humidity+human detection information (=1)".

Next, the transmitter 240 issues this information (step S120).

Next, the transmission interval controller 230 sets "human sensing regular issuance flag ZTF=1" (step S125), and then proceeds to the processing of step S140 to end the regular issuance.

On the other hand, when it is determined in step S115 that "human sensor detection latch ZL=1" is not set (step S115; NO), the transmission interval controller 230 instructs the transmitter 240 to issue the information of "measurement information of illuminance, atmospheric pressure, temperature, humidity+human detection information (=0)".

Next, the transmitter 240 issues this information (step S130)

Next, the transmission interval controller 230 sets "human sensing regular issuance flag ZTF=0" (step S135), and then proceeds to the processing of step S140 to end the regular issuance.

When the regular issuance by the transmitter 240 is completed, the transmission interval controller 230 determines whether or not "human sensor detection latch ZL=1" (step S145). When it is determined that "ZL=1" is not set in step S145 (step S145; NO), that is, when "ZL=0", the process directly proceeds to the processing of step S160.

On the other hand, when it is determined in step S145 that "ZL=1 (step S145; YES), the transmission interval controller 230 subsequently determines whether or not the human sensor output Zout of the human sensor 211 is "0" (step S150). When "Zout=0" is determined in step S150 (step S150; YES), "human sensor detection latch ZL=0" and the interruption permission flag INTF is set to "1" (step S155). Thereafter, the transmission interval controller 230 proceeds to the processing of step S160.

When it is determined in step S150 that "Zout=0" is not set (step S150; NO), the transmission interval controller 230 directly proceeds to the processing of step S160.

Next, in step S160, the transmission interval controller 230 turns off the second switch 170 and executes a return command (RET) in step S165 to return to the processing in step S50 of the main routine.

In addition, the regular issuance routine may be executed by a timer interruption by the timer 235.

Next, a flow of processing in the interruptive issuance will be described with reference to FIG. 10.

When the detector 220 detects that the output Zout of the human sensor 211 has changed from "0" to "1", it outputs the interruptive issuance request INT 1 of the interruptive issuance to the transmission interval controller 230. In addition, the interruptive issuance performed by the interruptive issuance request INT 1 being received by the transmission interval controller 230 is the case in which "human sensor detection latch ZL=0" (synonymous with "interruption permission flag INTF=1") and "human sensing regular issuance flag ZTF=0".

Then, when the interruptive issuance request INT 1 is input from the detector 220, the transmission interval controller 230 first determines whether or not "human sensor detection latch ZL=0" (step S200). That is, the transmission interval controller 230 determines whether or not interruptive issuance has already been performed within the period of one regular issuance. When it is determined not to be "ZL=0" (step S200; NO), the routine proceeds to step S245 and executes a return command (IRET) to end the interruptive issuance routine.

On the other hand, in step S200, when it is determined that "ZL=0" (step S200; YES), the transmission interval controller 230 sets "human sensor detection latch ZL=1" and "interruption permission flag INTF=0" (step S201.)

Next, the transmission interval controller 230 determines whether or not "human sensing regular issuance flag ZTF=0" (step S205). That is, the transmission interval controller 230 determines whether or not information of "human detection information=1" has been transmitted in the immediately previous regular issuance. When it is determined that "ZTF=0" is not set in step S205 (step S205; NO), that is, when information of "human detection information=1" has already been transmitted in the immediately previous regular issuance, the transmission interval controller 230 proceeds to step S245 without performing interruptive issuance and executes the return command (IRET) to end the interruptive issuance routine.

On the other hand, when it is determined that "ZTF=0" in step S205 (step S205; YES), that is, when information of "human detection information=1" has not been transmitted in the immediately previous regular issuance, the transmission interval controller 230 subsequently acquires the measurement value of the timer 235 (step S210).

Next, the transmission interval controller 230 determines whether or not the remaining time ($\Delta T$) until the next regular issuance is performed is, for example, 10 sec. or more (step S215). When it is determined in step S215 that "$\Delta T>10$ sec" is not satisfied (step S215; NO), the routine proceeds to step S245 and executes the return command (IRET) to end the interruptive issuance routine.

On the other hand, when it is determined in step S215 that "$\Delta T>10$ sec" (step S215; YES), the transmission interval controller 230 turns on the second switch 170 (step S220) and supplies power to the illuminance sensor and the like 212 to 215 and the transmitter 240.

Next, the transmitter 240 inputs information on the measurement data of the illuminance sensor and the like 212 to 215 (step S225).

Next, the transmitter 240 interruptively issues information of "measurement information of illuminance, atmospheric pressure, temperature, humidity+human detection information (=1)" (step S230).

Next, when the interruptive issuance by the transmitter 240 ends (step S235), the transmission interval controller 230 turns off the second switch 170 (step S240). Thereafter, the transmission interval controller 230 proceeds to step S245 and executes the return command (IRET) to end the interruptive issuance routine.

In this manner, the human sensor 211 is mounted in the sensor node 10, and when the human sensor 211 detects the presence of a human, interruptive issuance is configured to perform according to a predetermined condition. Thus, it is possible to ascertain information of a room such as an office or the like in which people are coming in and out in real time while limiting power consumption of the power storage. Therefore, when environmental information has greatly changed, in the monitoring center 20, it is possible to determine whether or not the cause of the environmental change is a change due to people coming in and out.

Figure 11:
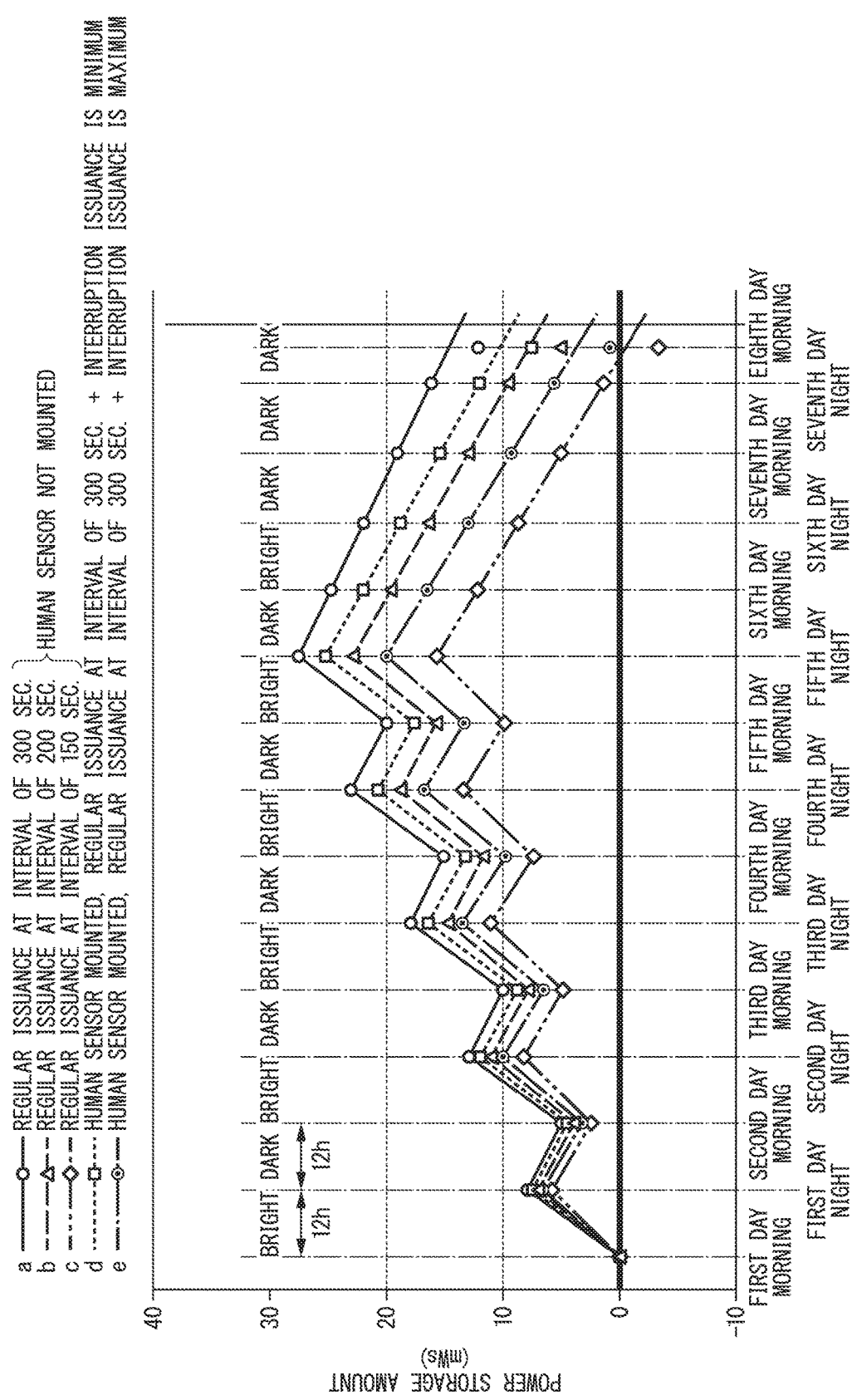
FIG. 11 is an image diagram showing an operational example of a sensor node according to the embodiment of the invention.

In addition, FIG. 11 is an image diagram showing an operational example of the sensor node 10 according to the embodiment of the invention.

In the example shown in FIG. 11, the vertical axis represents a power storage amount [mWs], the horizontal axis represents elapsed days, and change characteristics of the power storage amount in the power storage 100 is conceptually shown in the form of an image. The graph shown here shows, for example, a transition of the power storage amount of the power storage 100 for one week in an office or the like. In other words, the power storage amount transition characteristic shown in the figure shows the transition of the power storage amount of the power storage 100 for five days on weekdays from the first day to the fifth day (Monday to Friday) and for two days on holidays including the sixth day and seventh day (Saturday and Sunday).

In FIG. 11, "first day morning" represents the beginning point of the morning of the first day, "first day night" represents the beginning point of the night of the first day, and the same applies for the second day to the eighth day. In addition, the period indicated by "bright" represents, for example, a time zone during which the interior of the office is made bright by lighting or external light, and the period indicated by "dark" represents, for example, a time zone during which the interior of the office becomes dark because it is nighttime or illumination is turned off. It is assumed that the period indicated by "bright" and the period indicated by "dark" are each a period of 12 hours.

The power storage amount transition characteristic indicated by reference character a shows an example in which the human sensor 211 is not mounted and the environmental monitor 200 performs regular issuance every 300 sec. (second). Also, the power storage amount transition characteristic indicated by reference character b shows an example in which the human sensor 211 is not mounted and the environmental monitor 200 performs regular issuance every 200 sec. The power storage amount transition characteristic indicated by reference character c shows an example in which the human sensor 211 is not mounted and the environmental monitor 200 performs regular issuance every 150 sec.

The power storage amount transition characteristic indicated by reference character d shows an example in which the human sensor 211 is mounted, the environmental monitor 200 performs regular issuance every 300 sec., and a frequency of interruptive issuance is the minimum. That is, this power storage amount transition characteristic d is an example in which the human sensor 211 mounted in the sensor node 10 is always in operation and the power consumption increases accordingly, but since interruptive issuance is not performed, the power consumption due to the interruptive issuance is not generated.

The power storage amount transition characteristic indicated by reference character e shows an example in which the human sensor 211 is mounted, the environmental monitor 200 performs regular issuance every 300 sec., and a frequency of interruptive issuance is the maximum. That is, this power storage amount transition characteristic e is an example in which the human sensor 211 mounted in the sensor node 10 is always in operation, the power consumption thereby increases accordingly, and, since interruptive issuance is performed once in two regular issuance (once in 600 sec.), the power consumption due to the interruptive issuance is maximized.

As shown in FIG. 11, in the morning of the first day, the solar cell 110 starts to generate power, and the power storage 100 is charged by the solar cell 110 and the power storage amount is gradually increases. Thereafter, in the night of the first day, the charging by the solar cell 110 is stopped, and the power storage amount of the power storage 100 gradually decreases due to the power consumption of the sensor node 10. Thereafter, in the morning of the second day, the power storage 100 is charged again by the solar cell 110, and the power storage amount is gradually increases. Then, in the night of the second day, the charging by the solar cell 110 is stopped, and the power storage amount of the power storage 100 gradually decreases due to the power consumption of the sensor node 10.

Thereafter, on the third day, the fourth day, and the fifth day, charging and discharging in the power storage 100 are repeated, the power storage amount of the power storage 100 gradually increases as a whole, and the power storage amount of the power storage 100 is maximized at a time point at which the night of the fifth day starts. Then, charging by the solar cell 110 is not performed since the night of the fifth day until a time point at which the morning of the eighth day starts, the power storage amount of the power storage 100 gradually decreases due to the power consumption of the sensor node 10, and it becomes the minimum at a time point at which the morning of the eighth day starts.

In this way, when the environmental monitor 200 is operated on a weekly basis, the power storage 100 is charged by the solar cell 110 from the first day to the fifth day, and the environmental monitor 200 is operated using the power stored in the power storage 100 in the period from the night of the fifth day until the morning of the eighth day.

Then, as shown in power storage amount transition characteristics d and e of FIG. 11, on average, it is possible to issue environmental information in real time with an increment of power consumption to such a regular issuance interval as shown in the power storage amount transition characteristic b as to be shortened to two thirds (200 seconds) when a person enters the room.

As described above, the sensor node 10 according to the embodiment, includes a human sensor 211 (the first environmental sensor) and the illuminance sensor and the like 212 to 215 (the second to nth environmental sensors) which are configured to acquire information on an ambient environment, the second switch 170 (the power feeding switch) that is configured to switch an ON/OFF state of power supply from the power storage 100 to the illuminance sensor and the like 212 to 215 (the second to nth environmental sensors) and the transmitter 240, the transmitter 240 that is configured to regularly issue at least the ambient environmental information acquired by each of the illuminance sensor and the like 212 to 215 (the second to nth environmental sensors) at a cycle of 300 sec. (a predetermined cycle) and that is configured to irregularly issue environmental information (information on ambient environment) acquired of each of the human sensor 211 and the illuminance sensor and the like 212 to 215 (the first to nth environmental sensors), the detector 220 configured to detect whether the output Zout of the human sensor 211 has changed from "0" to "1" (whether the change value of the environmental information acquired by the first environmental sensor is larger than the first threshold value), and the transmission interval controller 230 that is configured to control the timings at which the transmitter 240 regularly and irregularly issue the environmental information.

When the storage capacitance in the power storage 100 is equal to or more than a predetermined level, power is constantly supplied from the power storage 100 to the human sensor 211, the transmission interval controller 230, and the detector 220, and the transmission interval controller 230 controls the second switch 170 to supply power from the power storage 100 to the illuminance sensor and the like 212 to 215 and the transmitter 240 at intervals of 300 sec. to cause the transmitter 240 to perform regular issuance.

In addition, when the detector 220 detects that the output of the human sensor 211 has changed from "0" to "1" (the change value is larger than the first threshold value), the transmission interval controller 230 controls the second switch 170 to supply power from the power storage 100 to the illuminance sensor and the like 212 to 215 and the transmitter 240 according to predetermined conditions so that the transmitter 240 performs interruptive issuance (irregular issuance).

In the sensor node 10 having such a configuration, when the storage capacitance in the power storage 100 is equal to or more than a predetermined level, the sensor node 10 constantly supplies power to the human sensor 211 (the first environmental sensor), the detector 220, and the transmission interval controller 230, and continuously operates them. In addition, the transmission interval controller 230 controls the second switch 170 (the power feeding switch) to supply power from the power storage 100 to the illuminance sensor and the like 212 to 215 (the second to nth environmental sensors) and the transmitter 240 at a predetermined cycle, and to cause the transmitter 240 to regularly issue at least the information on ambient environment acquired by each of the illuminance sensor and the like 212 to 215. Furthermore, when the detector 220 detects that the output of the human sensor 211 has changed from "0" to "1" (the change value of the environmental information acquired by the first environmental sensor is larger than the first threshold value), the transmission interval controller 230 controls the second switch 170 to supply power from the power storage 100 to the illuminance sensor and the like 212 to 215 and the transmitter 240 according to predetermined conditions so that the transmitter 240 performs interruptively issues (irregularly issues) information on the ambient environment acquired by each of the illuminance sensor and the like 212 to 215.

Accordingly, the sensor node can transmit a measured value in real time when an environmental change occurs while maintaining energy balance between the power generation amount and the power consumption amount.

In addition, in the above-described embodiment, in a condition (a predetermined condition) for performing interruptive issuance (irregular issuance), when it is detected that the human sensor 211 has changed from "0" to "1" (change value is greater than the first threshold value) more than once within a predetermined cycle, power is supplied to the illuminance sensor and the like 212 to 215 (the second to nth environmental sensors) and the transmitter 240, causing the transmitter 240 to perform the interruptive issuance (the irregular issuance) only for the case in which it is detected that the human sensor 211 has changed from "0" to "1" for the first time.

In this manner, when the detector 220 detects that the human sensor 211 has changed from "0" to "1" (change value is greater than the first threshold value) more than once within a predetermined cycle, the sensor node can allow the transmitter 240 to perform interruptive issuance (irregular issuance) only for the case of the first detection in which it is detected that the human sensor 211 has changed from "0" to "1". Thus, the sensor node can reduce the number of interruptive issuance (irregular issuance) and reduce power consumption of the power storage 100.

In the above-described embodiment, in a condition (a predetermined condition) for performing interruptive issuance (irregular issuance), when it is detected that the human sensor 211 has changed from "0" to "1" (change value is greater than the first threshold value) more than once within a period corresponding to two cycles of a predetermined cycle, power is supplied to the illuminance sensor and the like 212 to 215 (the second to nth environmental sensors) and the transmitter 240, causing the transmitter 240 to perform the interruptive issuance (the irregular issuance)

only for the case in which it is detected that the human sensor 211 has changed from "0" to "1" for the first time.

In this manner, when the detector 220 detects that the human sensor 211 has changed from "0" to "1" (change value is greater than the first threshold value) more than once within a period corresponding to two cycles of a predetermined cycle, the sensor node can allow the transmitter 240 to perform interruptive issuance (irregular issuance) only for the case of the first detection in which it is detected that the human sensor 211 has changed from "0" to "1". Thus, the sensor node can reduce the number of interruptive issuance (irregular issuance) and reduce power consumption of the power storage 100.

Although the invention has been described above, the sensor node according to the embodiments of the invention is not limited to the above-described shown examples, and various modifications can be added to the scope of the invention without departing from the scope of the invention.

In the environmental monitor 200, a sensor to which power is constantly supplied may not be limited to the human sensor 211, for example. For example, whichever the temperature sensor 214 or the atmospheric pressure sensor 213 it may be, the detector 220 may request the transmission interval controller 230 for interruptive issuance when temperature change is equal to or greater than a predetermined value. That is, the environmental monitor includes two or more environmental sensors and may be configured such that one environmental sensor is constantly receives power supply and performs measurement while the remaining environmental sensors perform measurement and transmission on a regular basis only.

Also, in the above-described embodiment, the environmental monitor 200 includes the human sensor 211, the illuminance sensor 212, the atmospheric pressure sensor 213, the temperature sensor 214, and the humidity sensor 215, but the invention is not limited thereto. The environmental monitor 200 may include, in addition to the human sensor 211, any one or more of the illuminance sensor 212, the atmospheric pressure sensor 213, the temperature sensor 214, and the humidity sensor 215. In addition, the environmental monitor 200 may include a sensor configured to detect information on other environments. Information on other environments includes, for example, CO2 concentration, a vibration, a water level, a current, a voltage, a sound an image, and the like.

In the above-described embodiment, the case in which the second switch 170 which is an example of the power feeding switch is used to switch the ON/OFF state of power supply from the power storage so that the timing of sensing by the second to nth environmental sensors and the timing of issuance by the transmitter are controlled has been described. That is, in the example shown in FIG. 2, the power feeding line DCL 1 is connected to the power feeding line DCL 3 via the second switch 170, and power is supplied to sensors other than the human sensor (the illuminance sensor 212, the atmospheric pressure sensor 213, the temperature sensor 214, and the humidity sensor 215) and the transmitter 240 by switching of the second switch 170. The invention is not limited to the use of such a second switch 170.

For example, without using the second switch 170, power supplied from the power storage 100 to the environmental monitor 200 may be supplied through the transmission interval controller 230 to the illuminance sensor 212, the atmospheric pressure sensor 213, the temperature sensor 214, the humidity sensor 215, and the transmitter 240.

In this case, the transmission interval controller 230, at a predetermined cycle, controls the timing of sensing by the illuminance sensor 212, the atmospheric pressure sensor 213, the temperature sensor 214, and the humidity sensor 215, and the timing of issuance by the transmitter 240. Also, the transmission interval controller 230 causes the transmitter 240 to perform regular issuance.

Furthermore, when the detector 220 detects that a change value is greater than the first threshold value, the transmission interval controller 230 controls the timing for supplying power to the illuminance sensor 212, the atmospheric pressure sensor 213, the temperature sensor 214, the humidity sensor 215, and the transmitter 240 according to a predetermined condition. Also, the transmission interval controller 230 causes the transmitter 240 to perform interruptive issuance.

DESCRIPTION OF REFERENCE NUMERAL 1 wireless sensor system
10, 10a, 10b sensor node
20 monitoring center
100 power storage
110 solar cell (power generator performing environmental power generation)
120 dc/dc converter
130 first storage battery
140 second storage battery
150 switcher
160 first switch
170 second switch (power feeding switch)
180 voltage detector
200 environmental monitor
211 human sensor (first environmental sensor)
212 illuminance sensor (environmental sensor)
213 atmospheric pressure sensor (environmental sensor)
214 temperature sensor (environmental sensor)
215 humidity sensor (environmental sensor)
220 detector
230 transmission interval controller
240 transmitter

What is claimed is:

1. A sensor node comprising:
  a first to nth (n is an integer equal to or greater than two) environmental sensors which are configured to acquire ambient environmental information;
  a transmitter that is configured to regularly issue ambient environmental information acquired by at least one of the second to nth environmental sensors at a predetermined cycle and is configured to irregularly issue ambient environmental information acquired by the first environmental sensor and ambient environmental information acquired by at least one of the second to nth environmental sensors;
  a detector that is configured to detect a change value of ambient environmental information acquired by the first environmental sensor which is greater than a first threshold value; and
  a transmission interval controller that is configured to control a timing at which the transmitter regularly and irregularly issues the ambient environmental information, wherein
  power is constantly supplied from a power storage to the first environmental sensor, the transmission interval controller, and the detector when storage capacitance of the power storage is equal to or greater than a threshold level, and wherein the transmission interval controller is configured to:
control a timing of sensing by the second to nth environmental sensor within the predetermined cycle and a timing of issuing by the transmitter to cause the transmitter to perform the regular issuance; and
control a timing of sensing by the second to nth environmental sensor and a timing of issuing by the transmitter to cause the transmitter to perform the irregular issuance such that, when the change value greater than the first threshold value is detected by the detector more than once within the predetermined cycle, power is supplied to the second to nth environmental sensors and the transmitter, only for the case in which the change value greater than the first threshold value is detected for the first time.

2. The sensor node according to claim 1, further comprising
a power feeding switch configured to switch an ON/OFF state of power supply from the power storage to the second to nth environmental sensor and the transmitter, wherein
the transmission interval controller is configured to:
control, when causing the transmitter to perform the regular issuance, the power feeding switch so that power is supplied from the power storage to the second to nth environmental sensors and the transmitter to cause the transmitter to perform the regular issuance; and
control, when causing the transmitter to perform the irregular issuance, the power feeding switch so that power is supplied from the power storage to the second to nth environmental sensors and the transmitter to cause the transmitter to perform the irregular issuance.

3. The sensor node according to claim 1, wherein
in the predetermined condition, when the change value greater than the first threshold value is detected more than once within a period corresponding to two cycles of the predetermined cycle, power is supplied to the second to nth environmental sensors and the transmitter to cause the transmitter to perform the irregular issuance only for the case in which the change value greater than the first threshold value is detected for the first time.

4. The sensor node according to claim 1, wherein
a period in which the transmission interval controller supplies power to the second to nth environmental sensors and the transmitter at a time other than the predetermined cycle is in accordance with the predetermined cycle.

5. The sensor node according to claim 1, wherein
in a first period corresponding to the predetermined cycle and a second period corresponding to the predetermined cycle after the first period, when the irregular issuance is not performed in the first period and when the change value of ambient environmental information acquired by the first environmental sensor is detected to be greater than the first threshold value in the second period, the irregular issuance is performed.

6. The sensor node according to claim 1, wherein
the first environmental sensor is a human sensor configured to detect presence of a person.

7. The sensor node according to claim 1, wherein
power is supplied to the first to nth environmental sensor, the transmitter, the transmission interval controller, and the detector by the power storage to which generated power of a power generator performing environmental power generation is stored, and
when remaining power or a voltage value of the power storage is within a predetermined value, the transmission interval controller changes an interval in which the regular issuance is performed.

8. A method of controlling a sensor node using a first to nth (n is an integer equal to or greater than two) environmental sensors which are configured to acquire ambient environmental information, a transmitter that is configured to regularly issue at least ambient environmental information acquired by each of the second to nth environmental sensors at a predetermined cycle, and irregularly issues ambient environmental information acquired by each of the first to nth environmental sensors, a detector that is configured to detect a change value of ambient environmental information acquired by the first environmental sensor which is greater than a first threshold value, and a transmission interval controller that is configured to control a timing at which the transmitter regularly and irregularly issues the ambient environmental information,
the method comprising:
constantly supplying power by a power storage to the first environmental sensor, the transmission interval controller, and the detector when storage capacitance of the power storage is equal to or greater than a threshold level;
controlling, by the transmission interval controller, a timing of sensing by the second to nth environmental sensor within the predetermined cycle and a timing of issuing by the transmitter to cause the transmitter to perform the regular issuance; and
controlling a timing of sensing by the second to nth environmental sensor and a timing of issuing by the transmitter by the transmission interval controller to cause the transmitter to perform the irregular issuance such that, when the change value greater than the first threshold value is detected by the detector more than once within the predetermined cycle, power is supplied to the second to nth environmental sensors and the transmitter, only for the case in which the change value greater than the first threshold value is detected for the first time.

9. The method of controlling sensor node according to claim 8, further comprising
using a power feeding switch configured to switch an ON/OFF state of power supply from the power storage to the second to nth environmental sensor and the transmitter, wherein
when causing the transmitter to perform the regular issuance, the power feeding switch is controlled by the transmission interval controller to supply power from the power storage to the second to nth environmental sensors and the transmitter to cause the transmitter to perform the regular issuance, and
when causing the transmitter to perform the irregular issuance, the power feeding switch is controlled by the transmission interval controller to supply power from the power storage to the second to nth environmental sensors and the transmitter to cause the transmitter to perform the irregular issuance.

* * * * *